United States Patent [19]

Inata et al.

[11] 4,292,151

[45] Sep. 29, 1981

[54] PROCESS FOR PREPARING A CURED COPOLYETHERESTER ELASTOMERIC COMPOSITION

[75] Inventors: Hiroo Inata; Makoto Ogasawara; Tsuto Morinaga; Akihiro Horike, all of Hino, Japan

[73] Assignee: Teijin Limited, Osaka, Japan

[21] Appl. No.: 15,798

[22] Filed: Feb. 27, 1979

[30] Foreign Application Priority Data

Mar. 1, 1978 [JP] Japan .................................. 53/23387
Jul. 3, 1978 [JP] Japan .................................. 53/79776

[51] Int. Cl.³ .......................... C08L 67/02; C08G 63/16
[52] U.S. Cl. .......................... 204/159.15; 204/159.19; 525/35; 525/41; 525/42
[58] Field of Search .................. 204/159.15, 159.19; 525/41

[56] References Cited

U.S. PATENT DOCUMENTS 3,968,015  7/1976  Nyberg .......................... 204/159.19
4,073,830  2/1978  Nyberg .......................... 204/159.19
4,196,066  4/1980  Inata et al. ...................... 204/159.19

FOREIGN PATENT DOCUMENTS 2745906  10/1977  Fed. Rep. of Germany.
48-78256  10/1973  Japan.

*Primary Examiner*—Wilbert J. Briggs, Sr.

*Attorney, Agent, or Firm*—Sherman & Shalloway

[57] ABSTRACT

A process for preparing a cured copolyetherester elastomeric composition comprising following steps I and II:

Step I: melt-extruding an uncured linear copolyetherester elastomeric composition of [A] and [B] to follow:

[A] a linear copolyetherester elastomer composed of (A-1) a hard segment consisting of
  (i) an acid component of which at least 70 mol % is an aromatic dicarboxylic acid and
  (ii) a diol component having an average molecular weight of up to 350 and (A-2) a soft segment consisting of
  (iii) a polyalkylene glycol having an average molecular weight of from 500 to 5,000 in an amount of from 10 to 80% by weight based on the elastomer [A]; and

[B] a compound having an unsaturated aliphatic moiety other than unsaturated conjugated moieties, said compound [B] being copolymerized or blended with said elastomer [A], wherein said unsaturated aliphatic moiety is chemically inert at the melt-extruding temperature, the amount of said moiety being 0.001 to 0.5 equivalent per 100 grams of said elastomer [A]

Step II: curing the resulting extrudate by irradiation of actinic light.

10 Claims, No Drawings

PROCESS FOR PREPARING A CURED COPOLYETHERESTER ELASTOMERIC COMPOSITION

The instant invention relates to a manufacture process by which to commercially advantageously provide cured copolyetherester elastomeric compositions in a form of shaped article showing highly improved elastic recovery as well as various excellent properties, such as mechanical properties, thermal stability, weatherability, chemical resistance, dimensional stability and so on. More particularly, the instant invention relates to a process for preparing a cured copolyetherester elastomeric composition comprising following steps I and II:

Step I: melt-extruding an uncured linear copolyetherester elastomeric composition of [A] and [B] to follow:
- [A] a linear copolyetherester elastomer composed of
  - (A-1) a hard segment consisting of
    - (i) an acid component of which at least 70 mol% is an aromatic dicarboxylic acid and
    - (ii) a diol component having an average molecular weight of up to 350 and
  - (A-2) a soft segment consisting of
    - (iii) a polyalkylene glycol having an average molecular weight of from 500 to 5,000 in an amount of from 10 to 80% by weight based on the elastomer [A]; and
- [B] a compound having an unsaturated aliphatic moiety other than unsaturated conjugated moieties, said compound [B] being copolymerized or blended with said elastomer [A], wherein said unsaturated aliphatic moiety is chemically inert at the melt-extruding temperature, the amount of said moiety being 0.001 to 0.5 equivalent per 100 grams of said elastomer [A], Step II: curing the resulting extrudate by irradiation of actinic light.

In recent years, polyester elastomers formed by block copolymerization of polyoxyalkylene glycol components, such as block copolymers of the polytetramethyleneterephthalate series formed by the copolymerization of polyoxytetramethylene glycols have attracted attention as elastomers substituting for natural rubber, synthetic rubber or elastomers of the urethane series. These polyester elastomers gain such merits as to be easy to mold due to thermoplasticity, but entail, on the other hand, such drawbacks as to be inferior in heat stability, low in the melting point and inferior specifically in the heat stability, in the case of polyester with a high content of polyoxyalkylene glycol components, easy to dissolve in solvents (such as chloroform, tetrahydrofuran and so on), inferior in the chemical resistance, tacky in the surface of shaped article, no good in the smoothness and rather unsatisfactory in the elastic recovery.

As a process of improving heat stability, chemical resistance and resistance to solvent solubility, in particular, on the other hand, heretofore polyester has been cross-linked by reacting with polyfunctional epoxy compound, isocyanate compound and so on and by using hydroxyl, carboxyl, etc. terminals of polyester. True, this process is useful for cross-linking thermoplastic polyester after mixing solution of the said polyester with such active compounds at low temperatures, but it is a question to cross-link the thermoplastic polyester after melt-molding, and the said active compounds entail such troubles as to be susceptible to influence of the water content of air or solvent, no good in the stability of solution after admixed, harmful to human bodies and so on. Its improved process has been desired.

A proposal is made for improvements on such drawbacks in JAPAN KOKAI (Japanese Laid-Open patent application) No. 78256/73 which comprises adding a free radical generator or both a free radical generator and a free radical transferring agent to a saturated thermoplastic polyester containing a hydrogen atom and/or halogen atoms being active on free radicals, and then heating the mixture to crosslink the polyester. In this proposal, the addition of free radical generator is essential, and before the cross-linkage forms, it must be added by such methods as not to raise the temperature to a point at which the free radical generator begins to act. Hence, as Examples of this JAPAN KOKAI show, an embodiment may be employed in which the radical generator is added to solution of polyester in solvent, the solvent being evaporated off at room temperature, followed by heat treatment of residues (e.g., as adhesives, paints, etc.). It is particularly impossible, however, to apply the invention of this JAPAN KOKAI to the production of melt-shaped articles such as fibers, films, sheets, tubes, pipes, and so on by injection-molding, extrusion molding, etc. In other words, the free radical generator must be stable at conditions of melt-mixing the free radical generator to polyester or at conditions of melt-shaping polyester. For cross-linking, melt-shaped articles prepared from the melt-blended composition must be heated to the melting temperature of the composition or higher at which the free radical generator turns active. Thus, in effect, it is impossible to have melt-shaped articles cross-linked with the shape remaining unchanged.

German OLS No. 2745906 (published on Oct. 12, 1977), the inventorship of which is identified as some of the coinventors of the present application, suggested a polyester composed of a saturated linear aromatic polyester in which at least 70 mole% of the acid component consists of an aromatic dicarboxylic acid and a polyallyl compound which contains not less than 2 allyl or substituted allyl groups in the molecule, not decomposing under conditions of melt-blending with the polyester, and is non-reactive with the polyester under conditions of melt-blending with the polyester in order to remove troubles and defects with conventional techniques as mentioned hereinabove. No mention is made of copolyetherester elastomeric compositions in this proposal.

Another proposal is known for providing a cross-linked poly(tetramethyleneterephthalate)-containing polymer having heat recovery (elastic memory) by imparting crosslinkability to poly(tetramethyleneterephthalate) which has not been successfully cross-linked by irradiation (U.S. Pat. No. 3,968,015 and U.S. Pat. No. 4,073,830). In this proposal, cross-linking, e.g., by irradiation, of a polymer comprising poly(tetramethyleneterephthalate) is made possible by the addition of N,N'-m-phenylenedimaleimide or both triallyl cyanurate and N,N'-m-phenylenedimaleimide.

In this proposal, however, it is indispensable to use the said N,N'-m-phenylenedimaleimide not belonging to the compound [B] in the instant invention. This proposal produces demerits such as to be easy to form gel product by reaction of N,N'-m-phenylenedimaleimide with polyester when melt-admixed, no good in the melt-stability and so on. Not only that, but the use of triallyl cyanurate entails such drawbacks as to cause trouble operationwise as well as working environmentwise in the melt-extruding operation because of readiness with which the said compound is liable to vaporize at mixing or molding temperatures, such as about 260° C.

The instant inventors study to provide a process by which to manufacture to commercial advantage cured copolyetherester elastomeric compositions in a form of shaped article showing highly improved elastic recovery, as well as various excellent properties, such as mechanical properties, heat stability, weatherability, chemical resistance, dimensional stability and so on, in consequence of which it was found that cured elastomeric shaped articles having the said satisfactory properties could be produced to commercial advantage by a process comprising step I of melt-extruding an uncured linear copolyetherester comprising the said specified hard segments (A-1) and the said specified soft segments (A-2), and the said specified compound having unsaturated aliphatic moieties [B] and step II of curing the resulting extrudate by irradiation of actinic light.

Therefore, the main objective of the instant invention consists in provision of a manufacture process by which to offer copolyetherester elastomeric shaped articles to commercial advantage which are combined with various excellent properties, such as heat stability, chemical resistance, weatherability, dimensional stability, elastic recovery, mechanical properties and so on.

The said objective and many other objectives and merits of the instant invention will be made more clear from the following description.

In the uncured linear polyetherester elastomeric composition of linear copolyetherester elastomer [A] and compound [B] having unsaturated aliphatic moieties other than unsaturated conjugated moieties being chemically inert at the melt-extruding temperature of the elastomeric composition used in the process of the instant invention, the said copolyetherester elastomer [A] consists of hard segments (A-1) and soft segments (A-2) to follow:

(A-1) hard segments consisting essentially of
  (i) an acid component of which at least 70 mol%, preferably at least 80 mol%, is an aromatic dicarboxylic acid and
  (ii) a diol component having an average molecular weight of up to 350 and
(A-2) soft segments consisting essentially of
  (iii) a polyalkylene glycol having an average molecular weight of 500 to 5,000, preferably 600 to 4,000, more preferably 800 to 3,000, in an amount of 10 to 80% by weight, preferably 15 to 75% by weight, based on the elastomer [A].

Examples of the acid component (i) are terephthalic acid, isophthalic acid, naphthalenedicarboxylic acid, diphenyldicarboxylic acid, diphenylsulfonedicarboxylic acid, diphenoxyethanedicarboxylic acid, diphenyletherdicarboxylic acid, methylterephthalic acid, and methylisophthalic acid. Of these, terephthalic acid is most preferred.

Other carboxylic acids may be used in an amount of not more than 30 mole%, preferably not more than 20 mole%, together with the aromatic dicarboxylic acid as the acid component (i). Examples of such carboxylic acids are aliphatic dicarboxylic acids such as succinic acid, adipic acid, sebacic acid, decanedicarboxylic acid or dodecanedicarboxylic acid; alicyclic dicarboxylic acids such as hexahydroterephthalic acid; hydroxycarboxylic acids such as ε-hydroxycaproic acid, hydroxybenzoic acid and hydroxyethoxybenzoic acid. An ester-forming derivatives of these such as their lower alkyl esters or aryl esters may also be used as an acid component.

Examples of the diol compound (ii) having an average molecular weight of up to 350 are ethylene glycol, trimethylene glycol, tetramethylene glycol, neopentylene glycol, hexamethylene glycol, decamethylene glycol, cyclohexane dimethylol, 2,2-bis(β-hydroxyethoxyphenyl)propane, hydroquinone, and 2,2-bis(hydroxyphenyl)propane. Of these, tetramethylene glycol are especially preferred.

Examples of the polyalkylene glycol (iii) are polyethylene glycol, polypropylene glycol, polytrimethyleneglycol, polytetramethylene glycol and a copolymer of these glycols. Of these, polytetramethylene glycol is especially preferred.

The copolyetherester elastomer [A] composed of the hard segment (short chain bond units) composed of the acid component (i) and the diol component (ii) and the soft segment (long chain bond units) composed of the acid component (i) and the polyalkylene glycol (iii) has an intrinsic viscosity [η], measured at 35° C. in o-chlorophenol, of preferably at least 0.4, more preferably at least 0.5.

The linear copolyetherester elastomer used in this invention can be produced in a customary manner by reacting an acid component (i) as exemplified hereinabove with a diol component (ii) and a polyalkylene glycol (iii). The reaction could be carried out at temperatures of 200° to 300° C., preferably 220° to 280° C., at normal pressure or under reduced pressure. On that occasion, by-products (such as water, alcohol, excess diol and so on) should preferably be distilled off from the reaction system. Detailed explanation is given in prior arts as cited below and could be used in the production of the copolyetherester elastomer [A].

As examples of such copolyetheresters can be cited as preferable, for instance, copolymers (viz., polyester elastomers) described in Japanese Patent Publication 31558/74, Japan Kokai 25295/72, Japan Kokai 29896/73, West German Laid-Open Patent Specification (OLS) 2035333 and transparent polyester elastomers prepared by processes described in Japan Kokai 38391/76, Japan Kokai 69595/76, Japan Kokai 857/77, Japan Kokai 54795/77, Japan Kokai 59654/77 and the like.

Further, average molecular weights of the said diol component (ii) and polyalkylene glycol (iii) are average molecular weights by weight.

In the instant invention the uncured linear copolyetherester elastomeric composition comprising the said linear copolyetherester [A] and compound [B] having unsaturated aliphatic moieties other than unsaturated conjugated moieties being chemically inert at the melt-extruding temperature [step I] is melt-extruded.

In the instant invention the said uncured linear copolyetherester elastomeric composition could be formed either by copolymerization of the said elastomer [A] with the said compound [B] or by blending together the said elastomer [A] and compound [B]. These both embodiments could be employed in combination. The amount of the said moieties is 0.001–0.5 equivalent, but preferably 0.005–0.3 equivalent, more preferably 0.01–0.1 equivalent, especially preferably 0.01–0.05 equivalent, per 100 grams of the elastomer [A].

In the instant invention the unsaturated aliphatic moieties of compound [B] are chemically inert at the melt-extruding temperature of the uncured linear copolyetherester elastomeric composition comprising [A] and [B]. By this is meant that at the melt-extruding temperature the unsaturated moieties do not substantially cause the reaction impeding with the curing of the uncured linear copolyetherester elastomeric composition composed of [A] and [B] in the hereinbelow-described step II with the breakdown of the moieties, or with the reaction between the moieties or reaction between the moieties and the copolyetherester elastomer [A] occurring. In the preferred emobodiment the compound [B] has chemically inert property such as not to cause the said unfavorable reaction in substance when held at a temperature of the melting point (Tm: °C.) of the copolyetherester elastomer [A] plus 20° C. for 15 minutes long.

As preferred example of the unsaturated aliphatic moieties other than unsaturated conjugated moieties being chemically inert at the melt-extruding temperature of the compound [B] possesses is cited an unsaturated aliphatic moiety containing at least one hydrogen atom at the α-carbon to the double bond, such as an allyl or substituted allyl moeity, as expressed by the following general formula (1);

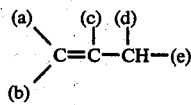

(1)

In the general formula (1), the bonds (a), (b), (c) and (d) are bonded either to a hydrogen atom or an organic group, and the bond (e) is bonded to an organic group. The organic groups bonded to the bonds (a), (b), (c), (d) and (e) are independent from each other, or together form a cyclic structure. In the latter case, the double bond in formula (1) may form part of the cyclic structure. The cyclic structure may be an alicyclic structure, a heterocyclic structure, etc., but is never an aromatic ring.

A more preferred structure of the moiety of formula (1) is expressed by the following general formula (2);

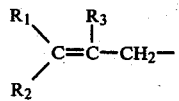

(2)

wherein $R_1$, $R_2$ and $R_3$ are identical or different, and each represent a member selected from the group consisting of a hydrogen atom and organic groups.

For a means by which to admix to the uncured linear copolyetherester elastomeric composition of [A] and [B] unsaturated moieties other than unsaturated conjugated moieties being chemically inert at the melt-extruding temperature of the said elastomeric composition, in the instant invention, as mentioned earlier, it could be achieved either by copolymerization of elastomer [A] and compound [B] or by blending these both.

Explanation will be given here of the former embodiment where the unsaturated aliphatic moieties are admixed to the uncured linear copolyetherester elastomeric composition.

In this embodiment, compound [B] contains, besides the unsaturated aliphatic moieties other than unsaturated conjugated moieties being chemically inert even at the said copolymerization conditions, at least one, preferably two, of ester-forming functional groups copolymerizable with the elastomer [A] under the copolymerization conditions. Among compounds [B] having such ester-forming functional groups and being represented by the said formula (1), preferably formula (2), can be illustrated as preferred compounds, those compounds which are represented by the following formula (3)

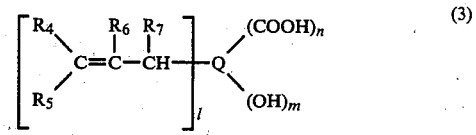

(3)

and ester-forming derivatives of the said compounds, such as alkylester derivatives, aryl ester derivatives or acid anhydrides. In the said general formula (3), $R_4$, $R_5$, $R_6$ and $R_7$ are each hydrogen or an organic group. As examples of the said organic group can be cited aliphatic groups, preferably $C_1-C_6$ alkyls, more preferably $C_1-C_3$ alkyls; alicyclic groups, preferably $C_5-C_{12}$ cycloalkyls and so forth. In the case of the said alkyl groups they, together or combined with Q in the formula (3), can form a 5- or 6-membered ring, n is 0, 1 or 2, m 0, 1 or 2 and $m+n=1$ or 2; l is 1 or 2. Q is a direct bond or a di- or tri-valent organic group if $l=1$ and $m+n=1$. In the other cases, it is a tri- or tetra-valent organic group. In the case, further, of $m+n=1$, the said group $R_4$ may be

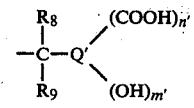

wherein $R_8$ and $R_9$ are each hydrogen or the same organic group as illustrated of the said $R_4-R_7$, n' is 0 or 1, m' 0 or 1 and $m'+n'=1$, and Q' is a direct bond, or a di- or tri-valent organic group. On that occasion, the $R_8$ or Q' can form a 5- or 6-membered ring combined with $R_5-R_7$ or Q. As organic groups of the said Q and Q' can be illustrated di- to tetra-valent $C_1-C_{20}$ aliphatic groups, $C_4-C_{20}$ alicyclic groups, $C_6-C_{12}$ aromatic groups, di- to tetra-valent moieties having heterocycles, such as triazine ring. As the preferred of $R_4-R_7$ can be cited hydrogen or methyl. As $R_4$ can be cited

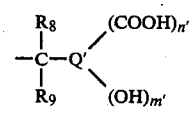

wherein $R_8$ and $R_9$ are each hydrogen or methyl. As particularly preferable can be cited the case where $R_5-R_7$ are each hydrogen and $R_4$ is hydrogen or

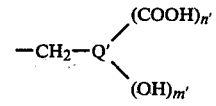

Among the compounds of formula (3) above the following are compounds belonging to the particularly preferred group:

(a) Compounds of formula (3) in which: $l=1$, $R_5$ and $R_6$ are each hydrogen, $R_4$ is an aliphatic group or a moiety

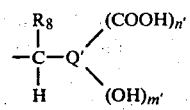

(wherein Q' is a direct bond or di- or tri-valent organic group, preferably C₁-C₆ aliphatic group, n' and m' are as defined above, R₈ is hydrogen or C₁-C₆ alkyl, preferably hydrogen), R₇ is hydrogen or alkyl, Q is a direct bond or di- to tri-valent organic group, preferably C₁-C₆ aliphatic group, said R₄ being a cyclic compound forming a 5- or 6-membered ring, preferably 6-membered ring, combined with R₇ or Q, wherein if R₇ is hydrogen, R₄ combines with Q, whereas if Q is a direct bond or a di-valent organic group, R₄ combines with R₇.

(b) Compounds of formula (3) in which: l=1, R₅, R₆ and R₇ are each hydrogen, R₄ is hydrogen, an alkyl group or a moiety

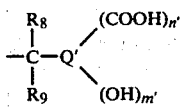

wherein R₈ and R₉ are each hydrogen or alkyl, Q' is a direct bond or a divalent organic group, preferably C₁-C₆ aliphatic group, m' and n' are as defined above in the formula (3), and Q is a direct bond or a di- or tri-valent organic group, preferably C₁-C₆ aliphatic group.

In the (a) and (b) above, m+n+m'+n'=2 should be more preferred.

As is clear from the foregoing, the compound represented by the said general formula (3) possesses at least one, preferably two, —OH and/or —COOH.

As such compounds can be listed carboxylic acids and oxycarboxylic acids, such as 3-(or 4-)cyclohexene-1,2-dicarboxylic acid, 3-cyclohexene-1,1-dicarboxylic acid, 4-cyclohexene-3,6-dimethyl-1,2-dicarboxylic acid, 2-cyclohexene-1,4-dicarboxylic acid, 3-(or 2-)hexene-1,6-dicarboxylic acid, 2-butene-1,4-dicarboxylic acid, 3-butene-1,2-dicarboxylic acid, 2-cyclohexenylethane-1,2-dicarboxylic acid, bicyclo[2,2,1]-5-pentene-2,3-dicarboxylic acid, allyloxy(or methallyloxy or crotyloxy)benzoic acid, 4-allyl-3-oxybenzoic acid, 2-(or 3-)cyclohexenecarboxylic acid, N-allyl(or crotyl)trimellitic acid imide and so on, and ester-forming derivatives, such as esters of lower alkyls, such as methyl, ethyl, propyl, aryl esters, such as phenylesters and acid anhydrides. Further, as other examples can be cited hydroxy compounds, such as 3-(or 4-)cyclohexene-1,2-dimethanol, 3-cyclohexene-1,1-dimethanol, 1-(or 2-)cyclohexene-1,4-dimethanol, 2-cyclohexene-1,4-diol, 2-butene-1,4-diol, 2-(1-butenyl)propane-1,3-diol, 3-pentene-1,2-diol, 3-hexene-3-methyl-1,6-diol, 2-butene-2,3-dimethyl-1,4-diol, 4-allyloxydiphenyl, 2,5-diallyl(or dimethallyl or dicrotyl)-1,4-dioxybenzene, 2,2-bis[3-allyl(or methallyl or crotyl)-4-hydroxyphenyl]propane, bis(3-allyl-4-hydroxyphenyl)sulphone, 2,2-bis[3-allyl(or methallyl or crotyl)-4-hydroxyethoxypenyl]propane, bis(3-allyl-4-hydroxyethoxyphenyl)sulphone, allylbis(β-hydroxyethyl)isocyanurate, N,N-diallyl-4-oxybenzamide and so on, and ester-forming derivatives thereof, such as lower aliphatic acid esters and so on.

Furthermore, as preferred examples of those which are converted into compounds represented by the said general formula (3) at copolymerization conditions to form copolymerizable compounds can be cited bisallyloxy(or methallyloxy or crotyloxy)benzene, 2,2-bis[4-allyloxy(or methallyloxy or crotyloxy)phenyl]propane, 1,1-bis(4-allyloxyphenyl)cyclohexane, bis(4-allyloxyphenyl)sulphone and so forth.

In the embodiment of the instant invention where by the copolymerization of the elastomer [A] with the compound [B] as illustrated above unsaturated aliphatic moieties other than unsaturated conjugated aliphatic moieties being chemically inert at the melt-extruding temperature of the uncured linear copolyetherester elastomeric composition of [A] and [B] the compound [B] possesses are admixed to the said composition, the said copolymerization could be carried out in the following manner, for instance: In the reaction for the preparation of the said linear copolyetherester elastomer, the compound [B] represented by the said formula (3) is added at a stage before the said reaction is finished, such as before the reaction begins, during the reaction, preferably before the beginning of the reaction at reduced pressure and so on, to copolymerize at a temperature of 200° to 300° C., preferably 280° C. at normal pressure or reduced pressure.

Further, in another embodiment of the instant invention, by blending together the elastomer [A] and the compound [B] unsaturated moieties other than unsaturated conjugated moieties being chemically inert at the melt-extruding temperature of the uncured linear copolyetherester elastomeric composition could be admixed to the said elastomeric composition. This embodiment will be explained as follows.

This embodiment comprises embodiment No. 1 of blending compound [B] having unsaturated aliphatic moieties other than unsaturated conjugated moieties which are chemically inert at the melt-extruding temperature and not having moieties which are chemically active at the melt-extruding temperature and embodiment No. 2 of blending compound [B] having unsaturated aliphatic moieties which are chemically inert at the melt-extruding temperature and having at least one epoxy group which is reactive with the elastomer [A].

In the former embodiment No. 1, it is compounds having at least two moieties represented by the said formula (1), preferably formula (2) that are preferably used. Such compounds form a more steadfast cross-linked structure in the extrudate in the hereinbelow-described curing treatment by irradiation of actinic light.

As preferred compounds [B] in use for this embodiment are exemplified compounds of (I)–(III) below:

(I) Compounds represented by the following formula (4)

$$Q_1\{X(Q_1'A)_{m''}\}_{n''} \qquad (4)$$

wherein
A is: a monovalent group having a structure represented by the said formula (1), preferably allyl or substituted allyl represented by the said formula (2),
X is: a member selected from the group consisting of —CONR₁₁ (wherein R₁₁ is a member selected from the group consisting of hydrogen and C₁-C₅ alkyl),

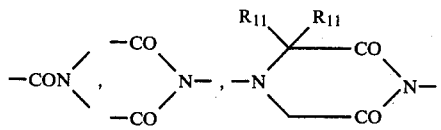

(wherein $R_{11}$ have the same meaning as the above, and two $R_{11}$ may be same or different), —COO—, and —O— (preferably, X is —CON> or —COO—.)

$Q_1$ is: a $C_2$–$C_{20}$ mono- to tetra-valent aliphatic group; $C_4$–$C_{12}$ mono- to tetra-valent alicyclic group; a mono- to tetra-valent group represented by

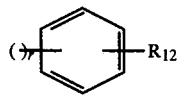

wherein $R_{12}$ is a member selected from the group consisting of hydrogen, $C_6$–$C_{12}$ alkyl, $C_1$–$C_6$ alkyl, $C_1$–$C_6$ alkyloxy, nitro and halogen and r is a number of bonds; a mono- to tetra-valent group represented by

wherein $R_{12}$ and r are as defined above;

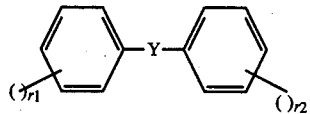

wherein Y is a member selected from the group consisting of —O—, —CO—, —SO$_2$—, —NR$_{11}$—, wherein $R_{11}$ is as defined above, —O(CH$_2$CH$_2$)$_{l'}$O—, wherein l' is an integer of 1-3, and $C_2$—$C_{12}$ alkylene, $r_1$ and $r_2$ are each a number of bonds and $r_1+r_2$ is an integer of 1-4, wherein if X is —O—, $Q_1$ should preferably be said aliphatic group or alicyclic group; as said aliphatic group $C_2$–$C_{20}$ alkylene, di- to tetravalent olefin residue,

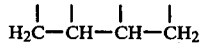

and so on are preferred, and as alicyclic group, mono- to tetravalent groups consisting of

mono- to tetravalent groups consisting of

and di- to tetravalent groups consisting of

can be preferably illustrated.

Q' is: a direct bond or a di- to tetra-valent group of said $Q_1$, preferably a direct bond or $C_1$–$C_5$ alkylene.

m" and n" are each an integer of 1-4, and m"×n"≧2 should be preferred, m"×n"≧3 being especially preferred.

As examples of such compounds of formula (4) can be illustrated the following compounds.

N,N'-diallyl(or dimethallyl or dicrotyl)adipoamide, N,N'-diallyl(or dimethallyl or dicrotyl)sebacamide, N,N'-diallyl(or dimethallyl or dicrotyl)decanedicarboxamide, N,N'-diallyl(or dimethallyl or dicrotyl)terephthalamide, N,N'-diallyl(or dimethallyl or dicrotyl)isophthalamide, N,N'-diallyl(or dimethallyl) or dicrotyl)naphthalenedicarboxamide, N,N'-diallyl(or dimethallyl or dicrotyl)hexahydrotetraphthalamide, N,N'-diallyl(or dimethallyl or dicrotyl)diphenoxyethanedicarboxamide, N,N',N"-triallyl(or trimethallyl or tricrotyl)trimesamide, N,N,N',N'-tetraallyl(or tetramethallyl or tetracrotyl)adipamide, N,N,N',N'-tetraallyl(or tetramethallyl or tetracrotyl)sebacamide, N,N,N',N'-tetraallyl(or tetramethallyl or tetracrotyl)decanedicarboxamide, N,N,N',N'-tetraallyl(or tetramethallyl or tetracrotyl)terephthalamide, N,N,N',N'-tetraallyl(or tetramethallyl or tetracrotyl)isophthalamide, N,N,N',N'-tetraallyl(or tetramethallyl or tetracrotyl)naphthalenedicarboxamide, N,N-diallyl(or dimethallyl or dicrotyl)benzamide, N,N,N',N'-tetraallyl(or tetramethallyl or tetracrotyl)hexahydroterephthalamide, N,N,N',N'-tetraallyl(or tetramethallyl or tetra crotyl)diphenoxyethanedicarboxamide, N,N,N',N',N"-hexaallyl(or hexamethallyl or hexacrotyl)trimesamide, N,N,N',N',N",N"-hexaallyl(or hexamethallyl or hexacrotyl)trimellitamide, N,N,N',N',N",N",N''',N'''-octallyl(or octamethallyl or octacrotyl)pyromellitamide, N,N'-diallyl(or dimethallyl or dicrotyl)pyromellitimide, N,N-diallyl(or dimethallyl or dicrotyl)benzophenone-3,4,3',4'-tetracarboxylic acid bis-imide, N,N'-diallyl(or dimethallyl or dicrotyl)butane-1,2,3,4-tetracarboxylic acid bis-imide, N,N'-diallyl(or dimethallyl or dicrotyl)cyclopentane-1,2,3,4-tetracarboxylic acid bisimide, ethylene bis[N-allyl(or methallyl or N-crotyl)trimellitimide]amide, tetramethylene bis[N-allyl(or N-methallyl or N-crotyl)trimellitimide]amide, hexamethylene bis[N-allyl(or N-methallyl or N-crotyl)trimellitimide]amide, decamethylenebis[N-allyl(or N-methallyl or N-crotyl)trimellitimide)amide, dodecamethylene bis[N-allyl(or N-methallyl or N-crotyl)trimellitimide]amide,

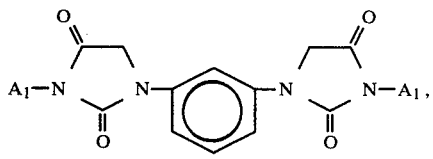

wherein $A_1$: allyl or methallyl or crotyl), N,N'-diallyl(or dimethallyl or dicrotyl)trimellitamideimide, N,N,N'-triallyl(or trimethallyl or tricrotyl)trimellitamideimide, ethylene(or trimethylene or tetramethylene or hexamethylene or decamethylene)bis(2-propylenecarboxamide), ethylene(or trimethylene or tetramethylene or hexamethylene or decamethylene)-bis[2-(or 3-)butenecarboxamide], ethylene(or tetramethylene or tetramethylene or hexamethylene or decamethylene)bis[2-(or 4-)pentenecarboxamide], ethylene(or trimethylene or tetramethylene or hexamethylene or decamethylene)bis[2-(or 3- or 4- or 5-)hexenecarboxamide], N-allyl(or crotyl or methallyl)-2-propylenecarboxamide, N-allyl(or crotyl or methallyl)-2-(or 3-)butenecarboxamide, N-allyl(or crotyl or methallyl)-2-(or 3- or 4-)propenecarboxamide, N-allyl(or crotyl or methallyl)-2-(or 3- or 4- or 5-)hexenecarboxamide, N,N-diallyl(or dicrotyl or dimethallyl)-2-propylenecarboxamide, N,N-diallyl(or dicrotyl or dimethallyl)-2-(or 3-)butenecarboxamide, N,N-diallyl(or dicrotyl or dimethallyl)-2-(or 3- or 4-)propenecarboxamide, N,N-diallyl(or dicrotyl or dimethallyl)-2-(or 3- or 4- or 5-)hexanecarboxamide, N,N'-diallyl(or dicrotyl or dimethallyl)-3-(or 2-)hexene-1,6-dicarboxamide, N,N'-diallyl(or dicrotyl or dimethallyl)-2-butene-1,4-dicarboxamide, N,N,N',N'-tetraallyl(or tetracrotyl or tetramethallyl)-3-(or 2-)hexene-1,6-dicarboxamide, N,N,N',N'-tetraallyl(or tetracrotyl or tetramethallyl)-2-butene-1,4-dicarboxamide, ethylene(or trimethylene or tetramethylene or hexamethylene or decamethylene)bis-3-(or 4-)cyclohexenecarboxamide, ethylene(or trimethylene or tetramethylene or hexamethylene)bis-2-(or 3-)cyclohexene-1,1-dicarboximide, ethylene(or trimethylene or tetramethylene or hexamethylene or decamethylene)bis-2-cyclohexene-1,4-dicarboxamide, N-allyl(or crotyl or methallyl)-2-(or 3)cyclohexenecarboxamide, N-allyl(or crotyl or methallyl)-3-(or 4-)cyclohexene-1,2-dicarboximide, N-allyl(or crotyl or methallyl)bicyclo[2,2,1]-5-heptene-2,3-dicarboximide, N,N-diallyl(or dicrotyl or dimethallyl)-2-(or 3-)cyclohexenecarboxamide, N,N,N',N'-tetraallyl(or tetracrotyl or tetramethallyl)-3-(or 4-)cyclohexene-1,2-dicarboxamide, N,N,N',N'-tetraallyl(or tetracrotyl or tetramethallyl)-3-cyclohexene-1,1-dicarboxamide, N,N,N',N'-tetraallyl(or tetracrotyl or tetramethallyl)-2-cyclohexene-1,4-dicarboxamide, N,N,N',N'-tetraallyl(or tetracrotyl or tetramethallyl)bicyclo[2,2,1]-5-heptene-2,3-dicarboxamide, N,N'-diallyl(or dicrotyl or dimethallyl)-2-cyclohexene-1,4-dicarboxamide, triallyl trimesate and triallyl trimellate.

(II) Derivatives of cyanuric acids or isocyanuric acids:

Compounds represented by the following formula (5) or (6)

wherein $A_2$ may be same or different, two of a plurality of $A_2$ are each a group selected from the group consisting of allyl, methallyl and crotyl, and the remaining $A_2$ is a member selected from the group consisting of a $C_2$–$C_{20}$ monovalent aliphatic group; $C_4$–$C_{12}$ monovalent alicyclic group;

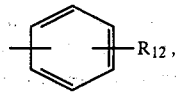

wherein $R_{12}$ is a member selected from hydrogen, $C_6$–$C_{12}$ aryl, $C_1$–$C_6$ alkyl, $C_1$–$C_6$ alkyloxy, nitro and halogen;

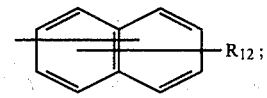

wherein $R_{12}$ is as defined above; and

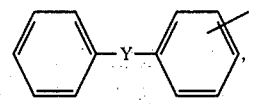

wherein Y is a member selected from the group consisting of —O—, —CO—, —SO$_2$—, —NR$_{11}$—, wherein $R_{11}$ is hydrogen or $C_1$–$C_5$ alkyl, —O(CH$_2$CH$_2$)$_{l'}$O—, wherein $l'$ is an integer of 1–3, and $C_2$–$C_{12}$ alkylene, $Q_2$ is a $C_2$–$C_{20}$ di- to tetra-valent aliphatic group; $C_4$–$C_{12}$ di- to tetra-valent alicyclic group; a di- to tetra-valent group represented by

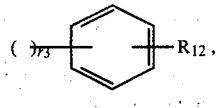

wherein $R_{12}$ is as defined above, $r_3$ is a number of bonds and an integer of 2–4; a di- to tetra-valent group represented by

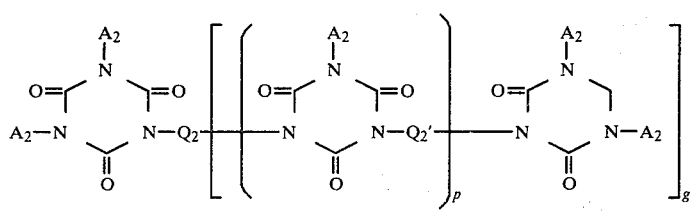

(5)

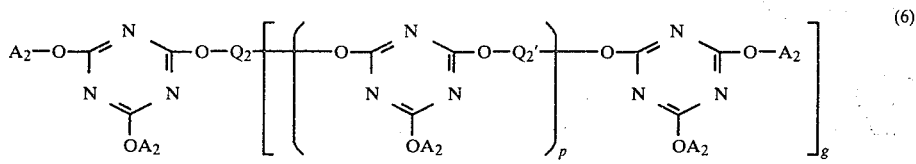

(6)

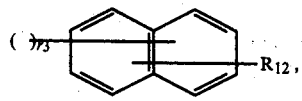

wherein R$_{12}$ and r$_3$ are as defined above, and a di- to tetra-valent group represented by

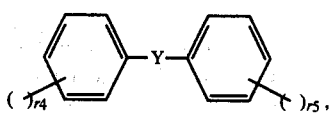

wherein Y is as defined above, r$_4$ and r$_5$ are each a number of bonds and r$_4$+r$_5$ is an integer of 2-4, Q'$_2$ is a divalent group of said Q$_2$, p is 0 or an integer of 1-10, and q is an integer of 1-3, and p+q=1 is particularly preferred.

As examples of compounds represented by the said formula (5) or (6) following compounds can be illustrated.

Ethylenebis[diallyl(or dicrotyl or dimethallyl)isocyanurate], tetramethylenebis[diallyl(or dicrotyl or dimethallyl)isocyanurate], hexamethylenebis[diallyl(or dicrotyl or dimethallyl)isocyanurate], decamethylenebis[diallyl(or dicrotyl or dimethallyl)isocyanurate], oxydiethylenebis[diallyl(or dicrotyl or dimethallyl)isocyanurate], 1,2-bis(3,5-diallylisocyanuroethyloxy)-ethane, methylenebis[diallyl(or dicrotyl or dimethallyl)]cyanurate, tetramethylenebis[diallyl(or dimethallyl or dicrotyl)cyanurate], hexamethylenebis[diallyl(or dimethallyl or dicrotyl)cyanurate], decamethylenebis[diallyl(or dimethallyl or dicrotyl)cyanurate], oxydiethylenebis[diallyl(or dicrotyl or dimethallyl)cyanurate], 1,2-bis(3,5-diallylcyanuroethyloxy)-ethane.

The compound could be readily synthesized by following the procedure set forth in the Zh, Organ, Khim., 2(10), p. 1742-3 (1965), or J. Am. Chem. Soc., 73, p. 3003 (1951).

(III) Polymers obtained by using, as starting material, those compounds which are represented by the general formula (3):

(a) Polyesters represented by the following formula (7) or (8):

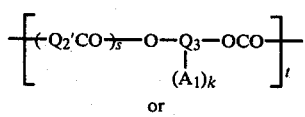

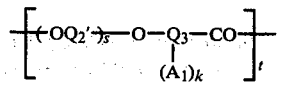

wherein

A$_1$ is a group selected from the group consisting of allyl, methallyl and crotyl, Q'$_2$ is a member selected from the group consisting of a C$_2$-C$_{20}$ divalent aliphatic group; C$_4$-C$_{12}$ divalent alicyclic group;

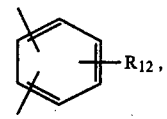

wherein

R$_{12}$ is a member selected from the group consisting of hydrogen, C$_6$-C$_{12}$ aryl, C$_1$-C$_6$ alkyl, C$_1$-C$_6$ alkyloxy, nitro and hydrogen;

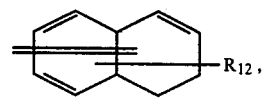

wherein

R$_{12}$ is as defined above;

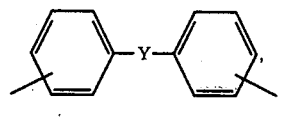

wherein

Y is a member selected from the group consisting of —O—, —CO—, —SO$_2$—, —NR$_{11}$—, wherein R$_{11}$ is hydrogen or C$_1$-C$_5$ alkyl, —O(CH$_2$CH$_2$)$_{l'}$O, wherein l' is an integer of 1-3, and C$_2$-C$_{12}$ alkylene, Q$_3$ is a member selected from the group consisting of a group of a valence of 3—(k+2) represented by

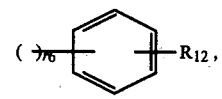

wherein

R$_{12}$ is as defined above, and r$_6$ is a number of bonds and an integer of 3—(k+2) and a group of a valence of 3—(k+2) represented by

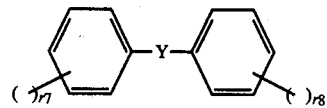

wherein

Y is as defined above, r$_7$ and r$_8$ are each a number of bonds and r$_7$+r$_8$ is an integer of 3—(k+2), k is an integer of 1-4, s is 0 or 1, t is an integer of not less than 2 to 20 and k×t≧2.

With such polymers of (7) can be obtained by reacting by following the heretofore-known procedure Q'$_2$(COOH)$_2$ or ester-forming derivatives thereof (such as C$_1$-C$_3$ alkyl ester, C$_6$-C$_{12}$ aryl ester and acid halide) in the case of s=1 and a compound, such as COCl$_2$, diallylcarbonate and so on, in the case of s=0 and

or ester-forming derivatives thereof (such as lower fatty acid ester, alkali metal salt and so on), whereas compounds of (8) can be obtained by reacting by following the heretoforeknown procedure

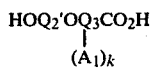

or ester-forming derivatives thereof in the case of s=1, and

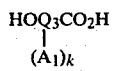

or ester-forming derivatives thereof in the case of s=0. In the instant invention terminals of these polymers become terminals of components forming compounds represented by the said formula, but should preferably be converted into terminals in a form of alkyl- or aryl-ester form, for instance, by normal procedure.

As examples of such polymers of formula (7) or (8) can be illustrated those polymers which have the following recurring units. (In the following compounds, however, $A_1$ is allyl or methallyl or crotyl.)

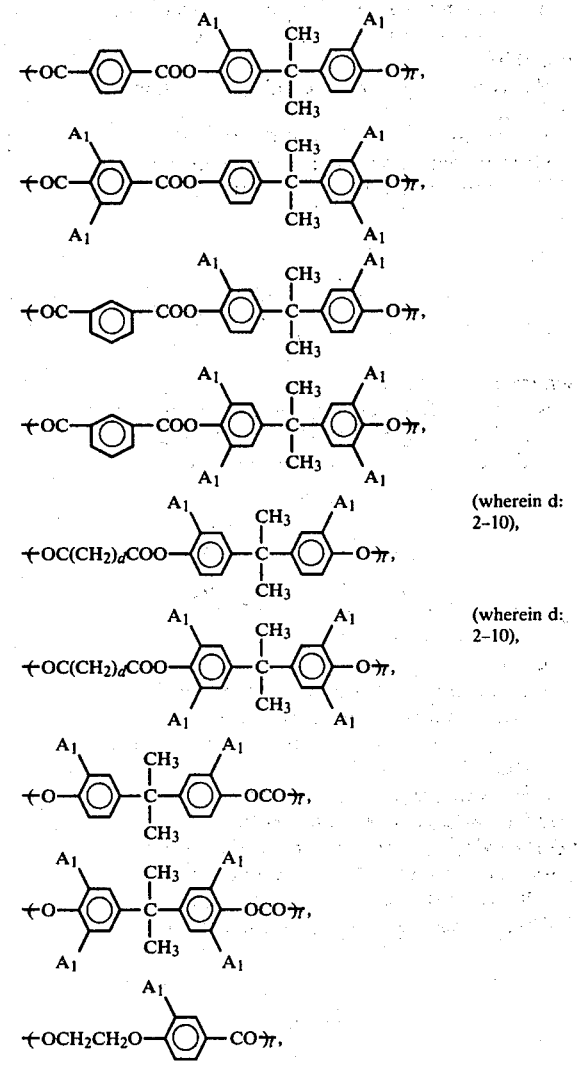

(wherein d: 2-10), (wherein d: 2-10),

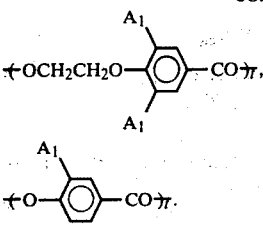

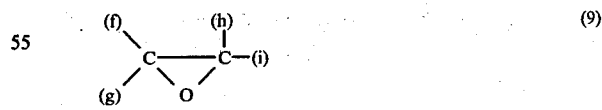

(b) Polyamides:

Poly(ethylene-2-butene-1,4-dicarboxamide), poly(tetramethylene-2-butene-1,4-dicarboxamide), poly(hexamethylene-2-butene-1,4-dicarboxamide), poly(decamethylene-2-butene-1,4-dicarboxamide), poly-(ethylene-3-(or 2-)hexene-1,6-dicarboxamide), poly(tetramethylene-3-(or 2-)hexene-1,6-dicarboxamide), poly(-hexamethylene-3-(or 2-)hexene-1,6-dicarboxamide) and poly(decamethylene-3-(or 2-)hexene-1,6-dicarboxamide).

In the next place, as compounds showing intermediate performance between the copolymerized type and the mixed type can be cited polyesters comparatively easy to cause the ester-interchange reaction, such as linear polyesters, such as polyethylene-2-butene-1,4-dicarboxylate, polytetramethylene-2-butene-1,4-dicarboxylate, polyethylene-3-(or 2-)hexene-1,6-dicarboxylate, polytetramethylene-3-(or 2-)hexene-1,6-dicarboxylate, poly-2-buteneadipate, poly-2-butenesebacate, poly-3-cyclohexene-1,1-dimethyleneterephthalate and so on, or copolymers of the said polyesters with glycol components and high in the degree of polymerization (such as 0.4 or more in the intrinsic viscosity). These ones are less in the lowering of the polymerization degree as a whole even if reacted in part with the copolyetherester elastomer at the time of melt-blending and/or molding.

As compound [B] used in the embodiment No. 1 compounds of (I) or (II) above are preferred and it is compounds (II) that are particularly preferred.

Explanation will be given here of embodiment No. 2 of admixing unsaturated aliphatic moieties to the uncured linear copolyetherester elastomeric composition used in the step I by blending compound [B] having unsaturated aliphatic moieties other than unsaturated conjugated moieties which are chemically inert at the melt-extruding temperature and having at least one epoxy group which is reactive with the elastomer [A].

In this embodiment, besides the said moieties of formula (1), preferably formula (2), compound [B] contains at least one epoxy group represented by the following formula (9):

$$\begin{array}{c} \text{(f)} \quad \text{(h)} \\ \diagdown \quad | \\ \text{C} \longrightarrow \text{C}-\text{(i)} \\ \diagup \quad \diagup \\ \text{(g)} \quad \text{O} \end{array} \quad (9)$$

wherein a group to link to bonds (f), (g), (h) and (i) is hydrogen or an organic group and at least one of these is an organic group, the said organic group is an organic group containing the group represented by the said general formula (1) or (2); the organic group linking to bond of (f), (g), (h) or (i) may be independent or may form a ring structure with the said bonds of (a), (b), (c), (d) and (e) or organic groups linked to the said bonds: preferred groups to link to bonds except bonds linked to organic groups containing groups represented by the general formula (1) or (2) of the bonds of the general formula (9) are hydrogen or $C_1$–$C_6$ alkyls. Preferred epoxy groups of formula (9) are glycidyl, 2,3-epoxy-2-methylpropyl and 2,3-epoxybutyl. The glycidyl group is especially preferred.

In the instant invention comprising the embodiment No. 1 and embodiment No. 2 and in the case, in particular, of embodiment No. 2, the compound [B], when melt-blended with the polyetherester elastomer [A] under conditions of melt-blending with the elastomer, should not substantially form an insoluble matter which is insoluble in o-chlorophenol at 35° C., and should not cause an unnegligible decrease in the intrinsic viscosity [η] of the polyester (for instance, a decrease to less than 0.3). For example, unsuitable are those compounds containing highly reactive ester-forming functional groups other than the epoxy group (for example, highly reactive esters, highly reactive hydroxyl group, highly reactive carboxyl group, etc.) and those compounds which decompose or gasify at the melting temperature of the polyester. As compound [B] used in the embodiment No. 2 can be used a compound having at least one, preferably at least 2, aliphatic unsaturated moiety other than conjugated unsaturated moiety, said aliphatic unsaturated moiety being inert at the melt-extruding temperature and having at least one, preferably one or two, epoxy group represented by the above formula (9).

Preferred examples of the compound [B] of the above type are expressed by the following formula

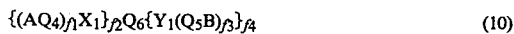

wherein A represents a group having the structure expressed by formula (1), preferably an allyl or substituted allyl group expressed by formula (2); B represents an epoxy group having the structure expressed by formula (9); $X_1$ represents a direct bond, —O—,

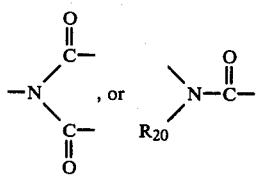

in which $R_{20}$ represents a hydrogen atom, an alkyl group having 1 to 6 carbon atoms, or $AQ_4$—; $Y_1$ represents a direct bond, —O—, or —NH—; $Q_6$ represents an organic group having a valence of 2 to 4; $Q_4$ and $Q_5$ represent a direct bond or an organic group having a valence of 2 to 4; and $f_1$, $f_2$, $f_3$ and $f_4$ are positive integers.

More preferred species of the compound of general formula (10) are compounds (i) to (iii) below.

(i) Cyanuric acid or isocyanuric acid derivatives corresponding to general formula (10) in which $X_1$ and $Y_1$ represent a direct bond; $Q_6$ represents

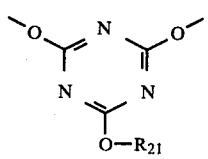

or

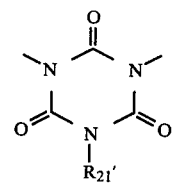

in which $R_{21}$ and $R_{21'}$ represent an alkyl group, $AQ_4$-, or $BQ_5$; $Q_4$ and $Q_5$ represent a direct bond or an alkylene group with 1 to 5 carbon atoms; and each of $f_1$, $f_2$, $f_3$ and $f_4$ is 1.

(ii) Imide or amide compounds corresponding to general formula (10) wherein $X_1$ is >NCO, or

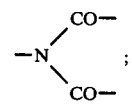

$Q_6$ represents an aliphatic group having a valence of 2 to 4 and containing 2 to 20 carbon atoms, an alicyclic group having a valence of 2 to 4 and containing 4 to 12 carbon atoms, a group having a valence of 2 to 4 and comprising

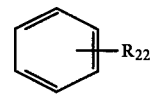

(in which $R_{22}$ represents a hydrogen atom, an aryl group with 6 to 12 carbon atoms, an alkyl group with 1 to 6 carbon atoms, an alkyloxy group with 1 to 6 carbon atoms, a nitro group or a halogen atom), a group having a valence of 2 to 4 and comprising

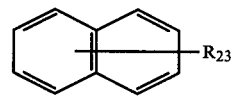

(in which $R_{23}$ is as defined above), or a group having a valence of 2 to 4 and comprising

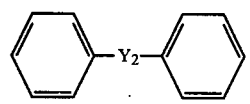

(in which $Y_2$ represents a member of the group consisting of —O—, —CO—, —$SO_2$—, —$NR_{22'}$—, $R_{22'}$ being a hydrogen atom or an alkyl group with 1 to 6 carbon atoms, —O($CH_2CH_2)_lO$—, l being an integer of 1 to 3, and alkylene groups with 2 to 12 carbon atoms); and $Q_4$ and $Q_5$ are the same as defined in (i) above. Preferred aliphatic groups $Q_6$ are alkylene groups with 2 to 20 carbon atoms, divalent olefin residues having the structure of general formula (1), and

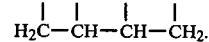

Preferred alicyclic groups $Q_6$ are groups having a valence of 2 to 4 and comprising

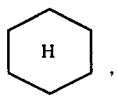

groups having a valence of 2 to 4 and comprising

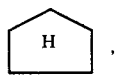

and groups having a valence of 2 to 4 and comprising

(iii) Compounds corresponding to general formula (10) in which X represents —O— or a direct bond; $Q_6$ is the same as $Q_6$ in (ii), with the proviso that when $X_1$ is —O—, $Q_6$ is preferably an aliphatic or alicyclic group; and $Q_4$ and $Q_5$ are the same as $Q_4$ and $Q_5$ in (i).

Specific examples of the reactive compound [B] of the above formulae suitable for use in the present invention are listed below.

As compounds used in the embodiment No. 2 the following compounds of (IV)—(VI) can be mentioned.

(IV) Cyanuric or isocyanuric acid derivatives:

Diallyl(or dimethallyl, or dicrotyl)glycidyl cyanurate, diallyl(or dimethallyl, or dicrotyl)glycidyl isocyanurate, allyl(or methallyl, or crotyl)diglycidyl cyanurate, allyl(or methallyl, or crotyl)diglycidyl isocyanurate, diallyl-(2,3-epoxy-2-methylpropyl)cyanurate, dimethallyl-(2,3-epoxy-2-methylpropyl)cyanurate, diallyl-(2,3-epoxy-2-methylpropyl)isocyanurate, dimethallyl-(2,3-epoxy-2-methylpropyl)isocyanurate, dicrotyl-(2,3-epoxy-2-methylpropyl)isocyanurate, diallyl-(2,3-epoxybutyl)cyanurate, diallyl-(2,3-epoxybutyl)isocyanurate, dimethallyl-(2,3-epoxybutyl)cyanurate, dimethallyl-(2,3-epoxybutyl)isocyanurate, dicrotyl-(2,3-epoxybutyl)isocyanurate, diallyl-(2,3-epoxy-2-methylbutyl)cyanurate, and diallyl-(2,3-epoxy-2-methylbutyl)isocyanurate.

(V) Amide of imide compounds:

N-allyl(or methallyl, or crotyl)glycidyloxy benzamide,

N,N-diallyl(or dimethallyl, or dicrotyl)glycidyloxy benzamide,

N,N-diallyl(or dimethallyl, or dicrotyl)glycidyloxy terephthalamide,

N,N,N',N'-tetraallyl(or tetramethallyl, or tetracrotyl)glycidyloxy isophthalamide, N,N,N',N'-tetraallyl(or tetramethallyl, or tetracrotyl)glycidyloxy terephthalamide, N,N-diallyl(or dimethallyl, or dicrotyl)-2,3-(or 3,4-)epoxycyclohexanecarboxamide, N,N'-diallyl(or dimethallyl, or dicrotyl)-3,4-(or 4,5-)epoxycyclohexane-1,2-dicarboxamide, N,N,N',N'-tetraallyl(or tetramethallyl, or tetracrotyl)-3,4-(or 4,5-)epoxycyclohexane-1,2-dicarboxamide, N,N'-diallyl(or dimethallyl, or dicrotyl)-3,4-epoxycyclohexane-1,1-dicarboxamide, N,N,N',N'-tetraallyl(or tetramethallyl, or tetracrotyl)-3,4-epoxycyclohexane-1,1-dicarboxamide, N,N-diallyl(or dimethallyl, or dicrotyl)-2,3-epoxycyclohexane-1,4-dicarboxamide, N,N'-diallyl(or dimethallyl, or dicrotyl)-2,3-(or 3,4-)epoxyhexane-1,6-dicarboxamide, N,N,N',N'-tetraallyl(or tetramethallyl, or tetracrotyl)-2,3-(or 3,4-)epoxyhexane-1,6-dicarboxamide, N,N'-diallyl(or dimethallyl, or dicrotyl)-2,3-epoxybutane-1,4-dicarboxamide, N,N,N',N'-tetraallyl(or tetramethallyl, or tetracrotyl)-2,3-epoxybutane-1,4-dicarboxamide, N-allyl(or methallyl, or crotyl)glycidyloxyphthalimide, N-allyl-(2,3-epoxy-2-methylpropyloxy)benzamide, N-methallyl-(2,3-epoxy-2-methylpropyloxy)benzamide, N,N-diallyl-(2,3-epoxy-2-methylpropyloxy)benzamide, N,N-dimethallyl-(2,3-epoxy-2-methylpropyloxy)benzamide, N,N'-diallyl(or dimethallyl)-(2,3-epoxybutyloxy)isophthalamide, N,N'-diallyl(or dimethallyl)-(2,3-epoxybutyloxy)terephthalamide, N,N,N',N'-tetraallyl(or tetramethallyl)-(2,3-epoxy-2-methylpropyloxy)isophthalamide, and N,N,N',N'-tetraallyl(or tetramethallyl)-(2,3-epoxy-2-methylpropyloxy)terephthalamide.

(IV) Other compounds:

2,2-bis[3-allyl(or methallyl, or crotyl)-4-glycidyloxyphenyl]propane, 1,1-bis[3-allyl(or methallyl, or crotyl)-4-glycidyloxyphenyl]cyclohexane,

[2-allyl(or methallyl, or crotyl)phenyl]glycidyl ether,

[2,6-diallyl(or dimethallyl, or dicrotyl)phenyl]glycidyl ether, 1,4-diglycidyloxy-2,6-diallyl(or dimethallyl, or dicrotyl)benzene, 2,2-bis[3,5-diallyl(or dimethallyl, or dicrotyl)-4-glycidyloxyphenyl]propane,

[2,4,6-triallyl(or trimethallyl, or tricrotyl)phenyl]glycidyl ether, 3,3'-diallyl(or dimethallyl, or dicrotyl)-4,4'-diglycidyloxybenzophenone, bis[3-allyl(or methallyl, or crotyl)-4-glycidyloxyphenyl]ether, bis[3,5-diallyl(or dimethallyl, or dicrotyl)-4-glycidyloxyphenyl]sulfone, 2,2-bis[3-allyl(or methallyl)-4-(2,3-epoxy-2-methylpropyloxy)phenyl]propane, 1,1-bis[3-allyl(or methallyl, or crotyl)-4-(2,3-epoxy-2-methylpropyloxy)phenyl]cyclohexane,

[2-allyl(or methallyl)phenyl]-(2,3-epoxy-2-methylpropyl)ether,

[2,6-diallyl(or dimethallyl)phenyl]-(2,3-epoxy-2-methylpropyl)ether,

[1,4-bis(2,3-epoxy-2-methylpropyloxy)]-2,6-diallyl(or dimethallyl, or dicrotyl)benzene, 2,2-bis[3,5-diallyl(or dimethallyl, or dictoryl)-4-(2,3-epoxy-2-methylpropyloxy)phenyl]propane,

[2,4,6-triallyl(or trimethallyl, or tricrotyl)phenyl]-(2,3-epoxy-2-methylpropyl)ether, 3,3'-diallyl(or dimethallyl, or dicrotyl)-4,4'-bis(2,3-epoxy-2-methylpropyloxy)benzophenone, bis[3-allyl(or methallyl, or crotyl)-4-(2,3-epoxy-2-methylpropyloxy)phenyl]ether, bis[3,5-diallyl(or dimethallyl, or dicrotyl)-4-(2,3-epoxy-2-methylpropyloxy)phenyl]sulfone, 2,2-bis[3-allyl-4-(2,3-epoxybutyloxy)phenyl]propane, 1,1-bis[3-allyl-4-(2,3-epoxybutyloxy)phenyl]cyclohexane, (2-allylphenyl)-(2,3-epoxybutyl)ether, (2,6-diallylphenyl)-(2,3-epoxybutyl)ether, 1,4-bis(2,3-epoxybutyloxy)-2,6-diallyl(or dimethallyl)benzene, 2,2-bis[3,5-diallyl(or dimethallyl)-4-(2,3-epoxybutyloxy)phenyl]propane, (2,4,6-triallylphenyl)-(2,3-epoxybutyl)ether, 3,3'-diallyl(or dimethallyl)-4,4'-bis(2,3-epoxybutyloxy)benzophenone, bis[3-allyl-4-(2,3-epoxybutyloxy)phenyl]ether, bis[3,5-diallyl-4-(2,3-epoxybutyloxy)phenyl]sulfone, and

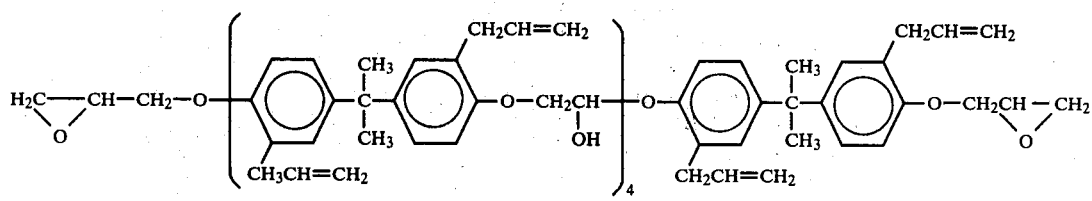

(t is a natural number, preferably about 1 to 20).

Of the above compounds, those of groups (IV) and (V), especially the former, are preferred.

According to the process of the instant invention, an extrudate of a desired form could be fabricated by step I comprising melt-extruding the uncured linear copolyetherester elastomeric composition obtained by copolymerizing or blending the said linear copolyetherester elastomer [A] with the said compound [B]. Following upon which the resulting extrudate is subjected to curing treatment by irradiation of actinic light.

On this occasion, when copolymerizing comcound [B] to form the elastomeric composition, the so-called master batch system could be preferably used which comprises preparing in advance a polyetherester elastomeric composition formed by copolymerizing compound [B] in excess of required amount, followed by melt-blending the said elastomeric composition with the polyetherester elastomer [A] not containing compound [B]. The compound [B] blended polyetherester elastomeric composition could be obtained by mixing the copolyetherester elastomer [A] and compound [B] by such mechanical mixing means as S-type blender and V-type blender, followed by uniformly kneading together by such a kneader as extruder at temperatures for the copolyetherester [A] to assue a fused condition, preferably in the range of from the melting point (Tm) of the copolyetherester [A] to about 100° C. higher than the said melting point.

As shaped articles obtained as extrudate of the polyetherester elastomeric composition can be cited films, such as film and sheets, filaments, such as filaments, fibers and yarns, hollow articles, such as tubes and pipes, and other various forms of shaped articles. As means by which to form into these shaped articles could be used means, such as melt-spinning, meltfilm manufacturing, melt-injection molding, melt extrusion molding, melt transfer molding and so on. These moldings could be effected at temperatures above the melting point (Tm) of the polyester, preferably from the melting point of the polyester to less than the breakdown temperature of the polyester, more preferably from the said melting point to about 60° C. higher than the said melting point. In the instant invention the said shaped articles should preferably be films, filaments and tubes. Furthermore, their stretched products would be all right.

In the step II of the instant invention the resulting extrudate (shaped article) is cured by irradiation of actinic light.

As the embodiment of step II above can be cited (A) a mean by which to project ultraviolet rays preferably in the presence of a photo-reaction initiator at temperatures (°C.) of from room temperature to the melting point (Tm) of the polyester, preferably from above the glass transition temperature (Tg) of the polyester to (Tm−10)°C., more preferably from (Tg+10)°C. to (Tm−20)°C.; (B) a means by which to project electron beams at doses of 0.01 Mrad to 100 Mrad, for instance, under such temperature conditions as from room temperature to Tm, preferably from Tg(°C.) to (Tm−10)°C., more preferably (Tg+10)°C. to (Tm−20)°C.; (C) a means by which to optionally combine the said means of (A) and (B).

In the curing treatment embodiment by means of (A) above it should preferably conducted in the presence of a photo-reaction initiator. In this case, the photo-reaction initiator could be incorporated by copolymerizing with or admixing to the polyetherester elastomer [A] as is the case with the compound [B]. Consequently, it is preferred to use those photo-reaction initiators which do not decompose themselves or do not lose the photo-reaction initiating effect at the melt conditions of the polyester.

As such photo-reaction initiators can be illustrated, as preferable, aromatic ketones, benzil and derivatives thereof, benzoin and derivatives thereof, polynuclear quinones and so forth.

Specific examples of the photo-reaction initiators are benzophenone, 4-methylbenzophenone, 4-nitrobenzophenone, 3-methylbenzophenone, 4,4'-dimethylbenzophenone, 3,3'-dimethylbenzophenone, 3,4'-dimethylbenzophenone, 4-phenylbenzophenone, 3-phenylbenzophenone, 3,3'-dinitrobenzophenone, 4,4'-dinitrobenzophenone, 3-nitrobenzophenone, 4-methoxybenzophenone, 3-methoxybenzophenone, 4,4'-dimethoxybenzophenone, 3,3'-dimethoxybenzophenone, bis(4-diphenyl)ketone, bis(3-diphenyl)ketone, 3,4-dimethylbenzophenone, 3,4,3',4'-tetramethylbenzophenone, Michler's ketone, anthraquinone, nitroanthraquinone, phenanthraquinone, acetophenone, propiophenone, benzil, benzoin, benzoin methyl ether, benzoin ethyl ether, benzoin propyl ether, benzoin butyl ether, benzoin phenyl ether, α-methylbenzoin methyl ether, α-phenylbenzoin ethyl ether, α-benzylbenzoin ethyl ether, benzil dimethyl ketal, benzil diethyl ketal, benzil dipropyl ketal, benzil ethylene ketal, benzil trimethylene ketal, benzil neopentylene ketal, benzil bis(2-methoxyethyl)-ketal, naphthyl phenyl ketone, bisnaphthyl ketone, ethylenebis(benzoylbenzamide), tetramethylenebis(benzoylbenzamide), hexamethylenebis(bensoylbenzamide), decamethylenebis(benzoylbenzamide), dodecamethylenebis (benzoylbenzamide), hexamethylenebis(4-acetylbenzamide), hexamethylenebis[(4-methylbenzoyl)benzamide], ethylenebis[(4-nitrobenzoyl)benzamide], dodecamethylenebis[(4-methoxybenzoyl)benzamide), dibenxoyl benzene, bis(4-methylbenzoyl)benzene, ethylenebis(benzoylphenyl ether), bis(benzoylmethyl) ether, tris(benzoylphenoxy)benzene, and bis(4-methoxybenzoylmethyl) ether.

The photo-reactive compounds disclosed in German OLS Nos. 1769168, 1769853, 1807297, 1807301, 1919678, and 1949010 which are stable under melt-extruding condition can also be used in this invention.

Further, benzophenone 4,4'-dicarboxylic acid can be illustrated as a compound which is the compound [B] having an ester-forming functional group copolymerizable with the elastomer [A] under copolymerization conditions and which is useful as photo-reaction initiator. Furthermore, as the blend type compound [B] those which show in themselves photo-reaction initiating effect are useful as photo-reaction initiator. As such compounds are cited, for instance, N-allyl (or crotyl or methallyl)benzoylbenzamide, N-allyl(or crotyl or methallyl)anthraquinonecarboxamide, N-allyl(or crotyl or methallyl)benzoylphthalimide, N,N-diallyl(or dicrotyl or dimethallyl)benzoylbenzamide, N,N'-diallyl(or dictotyl or dimethallyl)benzophenonetetracarboximide and so on.

Besides the process of admixing to the polyester by blending or copolymerization, the incorporation of the said photo-reaction initiator could be achieved by immersing shaped article obtained in the step I into a solution prepared by combining in a suitable way a carrier, dispersant and the like being known in the dyeing of the fibers of the polyester series or by spraying with such a such solution.

The composition of this invention may contain another various additives. Examples of the additives include oxidation or heat stabilizers of the hindered phenol, phosphorus compound and sulfur compound types such as

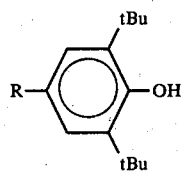

(R: H, alkyl, alkoxy),

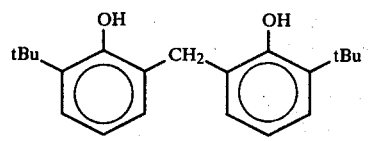

-continued

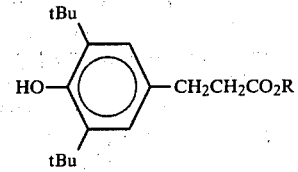

(R: $C_{1-20}$ alkyl), $RO_2CCH_2CH_2CH_2SCH_2CH_2CO_2R$ (R: $C_{1-20}$ alkyl), phosphoric acid, phosphorous acid, phosphonic acid, phosphonous acid, phosphinic acid, phosphinous acid, phosphine oxide, phosphine, and alkyl or aryl esters of these; coloring agents such as titanium oxide, carbon black, 1,5-dihydroxy-4,8-diaminoanthraquinone, 1,5-dihydroxy-4,8-diamino-2-phenylanthraquinone, 1-amino-2-cyano-4-methylaminoanthraquinone, 1-methylamino-4-toluidinoanthraquinone, 1,4-bisbenzylaminoanthraquinone, 1,4-diethylaminoanthraquinone, 1,4-dihexylaminoanthraquinone, 1-(2',6'-dimethylanilino)-4,5,8-trihydroxyanthraquinone, 1-(2',4',6'-trimethylanilino)-4,5,8-trihydroxyanthraquinone, 1-(2',6'-diethylanilino)-4,5,8-trihydroxyanthraquinone, and 1-(2'-methyl-6'-ethylanilino)-5,8-trihydroxyanthraquinone; fluorescent bleaching agents such as those available under the trademark Blankophor (BASF), Unitex (Ciba), Tinopal (Geigy Chemical), Leucophor (Sandoz), Kaycoll (Nippon Soda), Kayahor (Nippon Kayaku), and Whitex (Sumitomo Chemical); photo-reaction initiators such as those of the general formula $[R_8(Z'-R_7)_a]_b(Z)_c$ (to be described hereinbelow); inorganic and organic fire retardants, for example antimony compounds such as antimony trioxide, phosphorus compounds cited as those exemplified above as heat stabilizers, and halogen compounds such as hexabromobenzene, decabromobiphenyl, decabromobiphenyl ether, polycarbonates of tetrabromobisphenol A (degree of polymerization 2-30) and octabromobiphenyl; nucleating agents, lubricants or fillers such as silica, calcium carbonate, aluminum silicate, calcium phosphate, alumina, barium, sulfate, magnesium sulfate (talc), diatomaceous earth, glass fibers, and carbon fibers; and other stabilizers such as carbodiimide and epoxide compounds.

The amounts of the aforesaid additives can be selected as desired. For example, the amounts per 100 parts by weight of the polyetherester [A] may be not more than about 10 parts by weight, preferably about 0.05 to about 5 parts by weight, for the oxidation or heat stabilizers; not more than about 10 parts by weight, preferably about 0.01 to about 5 parts by weight for the coloring agents; not more than about 10 parts by weight, preferably about 0.01 to about 5 parts by weight, for the optical brighteners; 0.01 to 20 parts by weight, preferably 0.05 to 10 parts by weight, more preferably 0.1 to 5 parts by weight, especially preferably 0.1 to 3 parts by weight, for the photo-reaction initiators; not more than 30 parts by weight, preferably 1 to 20 parts by weight, for the fire retardants; and not more than about 50 parts by weight, preferably about 0.1 to about 30 parts by weight, for the nucleating agents, lubricants or fillers.

The most preferred process for the preparation of the cured polyetherester elastomer composition in a form of a shaped article of the instant invention is a process comprising molding while melted the uncured polyetherester elastomeric composition of [A] and [B] containing allyl or substituted allyl and photoreaction initiator into a desired shaped product, followed by crosslinking by irradiation of ultraviolet ray.

The cured polyetherester elastomeric composion of the instant invention is substantially insoluble in organic solvent. For instance, it does not completely dissolve in orthochlorophenol generally known as the best solvent for polyesters, for instance, and shows chemical resistance such as to remain as insoluble matter usually in the amount of 50% or more. Furthermore, the cured polyetherester elastomeric composition of the instant invention shows elongation at break of 50% or more, for instance, at room temperature notwithstanding a high degree of cross-linking as the above. It shows elongation at break of preferably 70% or more and more preferably 100% or more.

Moreover, the cured polyetherester elastomeric composition of the instant invention shows such a high degree of heat stability as not to melt even at 300° C. or more according to conditions. It is completely free of tackiness in the surface of shaped article, good in the smoothness and excellent in the elastic recovery as compared with those which are not cross-linked, as well as in the dimensional stability, mechanical properties and so on.

The instant invention will be more specifically explained by way of working examples as follows. In examples, "part" indicates "part by weight" in either instance. Reduced specific viscosity ($\eta$sp/c) is a value at c=1.2 g/dl and 35° C. in orthochlorophenol. Elastic recovery and work recovery were measured by stretching 100% at a tensile rate of 100%/minute by means of tensile tester (Model TM-M) made by Instron Engineering company.

EXAMPLES 1–9 AND COMPARATIVE EXAMPLE 1

The respective predetermined amounts of the aliphatic series of unsaturated group-containing compounds and photo-reaction initiators as shown in the following Table 1 were mixed by S-type blender to 100 parts of polyester elastomer (reduced specific viscosity 2.82) comprising, as acid component, terephthalic acid and as glycol component, 19%, based on the said terephthalic acid, of polytetramethylene glycol with molecular weight of about 2000 (about 66% by weight of the whole polymer), 27 mol% of ethylene glycol and 54 mol% of tetramethylene glycol, then fused at 240° C., extruded from a T-die and quenched to give film about 400$\mu$ thick. Films obtained were each transparent.

After that, the said films were each placed on a hot plate of which temperature is shown in Table 1 and irradiated from a position 30 cm away by a 2 KW high pressure mercury lamp (30 W/cm) during a given period of time. Table 1 shows elastic recovery, work recovery, heat deformation temperature and reduced specific viscosity of the respective films obtained.

As control indications were also made of physical properties of polyester elastomer film not blended with the aliphatic series of unsaturated group-containing compound and photo-reaction initiator.

For the heat deformation temperature film was cut off in size of 1 cm in width and 5 cm in length. The sample obtained was immersed vertically in silicone oil, and with a load of 19 g applied to the lower part the silicone oil was heated at a temperature elevating rate of 5° C./minute and indication was made by temperature at which the sample was stretched 50% and deformed.

TABLE 1

| | Aliphatic series of unsaturated group-containing compound () indicates part | Photo-reaction initiator () indicates part | Ultraviolet ray irradiation conditions Temperature (°C.) | Time (min) | Film properties Work recovery (%) | Elastic recovery (%) | Heat deformation temperature (°C.) | Reduced specific viscosity |
|---|---|---|---|---|---|---|---|---|
| Ex. 1 | ethylenebis(diallylisocyanurate) (4) | benzoinethylether (1) | 90 | 2 | 70 | 94 | >300 | *(91) |
| Ex. 2 | decamethylenebis-(diallylisocyanurate) (2) | benzildimethylketal (1) | 110 | 0.5 | 70 | 93 | >300 | *(83) |
| Ex. 3 | hexamethylenebis(diallylisocyanurate) (3) | benzoinmethylketal (1) | 70 | 4 | 71 | 92 | >300 | *(84) |
| Ex. 4 | oxydiethylenebis-(diallylisocyanurate) (2) | benzilethyleneketal (0.5) | 90 | 3 | 69 | 93 | >300 | *(85) |
| Ex. 5 | 1,4-bis(diallylisocyanuro)butene-2 (3) | benzophenone (1) | 120 | 2 | 69 | 90 | >300 | *(73) |
| Ex. 6 | N,N'-diallylsebacamide | benzoin (1) | 100 | 3 | 70 | 92 | >300 | *(79) |
| Ex. 7 | N,N,N',N'-tetraallylisophthalamide (1) | benzildiethylketal (0.5) | 110 | 2 | 69 | 91 | >300 | *(87) |
| Ex. 8 | N,N,N',N',N'',N''-hexaallyltrimesamide (1) | benzilethyleneketal (0.5) | 110 | 1 | 68 | 90 | >300 | *(74) |
| Ex. 9 | N,N-dimethallylbenzamide (2) | benzophenone (1) | 120 | 1 | 69 | 91 | >300 | *(80) |
| CEx. 1 | — | — | — | — | 61 | 76 | 145 | 2.4 |

Ex. = Example; CEx. = Comparative Example
*indicates insoluble even if immersed in a viscosity measurement solvent at 100° C. for one hour. () indicates amount (%) of insoluble matter.

Furthermore, the film of Comparative Example 1 was extremely great in the tackiness between the film and inconvenient to handle, but those of Examples 1–9 were totally free of tackiness in either instance.

EXAMPLES 10–13 AND COMPARATIVE EXAMPLE 2

The respective predetermined amounts of the aliphatic series of unsaturated group-containing compounds and photo-reaction initiators as shown in the following Table 2 were mixed by S-type blender to 100 parts of polyester elastomer (reduced specific viscosity 2.93) comprising, as acid component, terephthalic acid and as glycol component, 18 mol%, based on the said terephthalic acid, of polytetramethylene glycol with molecular weight of about 2000 (about 65% by weight of the whole polymer), 31 mol% of ethylene glycol and 51 mol% of tetramethylene glycol, then fused at 240° C., extruded from the T-die and quenched to give film about 400μ thick. The films obtained were each transparent.

The said films were each placed on a hot plate, like in Example 1, and irradiated from a position 30 cm away by a 2 KW high pressure mercury lamp (30 W/cm) for a given period of time. Table 2 shows elastic recovery, work recovery, heat deformation temperature and reduced specific viscosity of the respective films obtained.

As control indications were also made of physical properties of polyester elastomer film not blended with the aliphatic series of unsaturated group-containing compound and photo-reaction initiator.

EXAMPLES 14–23 AND COMPARATIVE EXAMPLE 3

The respective predetermined amounts of the aliphatic series of unsaturated group-containing compounds and photo-reaction initiators as shown in the following Table 3 were mixed in the same way as in Examples 10–13 to 100 parts of polyester elastomer (reduced specific viscosity 2.21) obtained by causing the reaction between 301 parts of dimethylterephthalate, 660 parts of polytetramethylene glycol with molecular weight of about 2000, 140 parts of tetramethylene glycol, 110 parts of 1,4-cyclohexanedimethylol (cis/trans ≈30/70) and 0.16 part of titanium tetrabutoxide and extruded from the T-die to give film about 500μ thick. These films were each transparent. Experiments with these films were conducted by following the procedure of Examples 10–13. Results were shown in Table 3.

Experiment with polyester elastomer film not mixed with the aliphatic series of unsaturated group-containing compound and photo-reaction initiator was conducted as Comparative Example 3.

Further, chemical resistance was indicated by weight increased rate (%) in the case of immersing in acetone or tetrahydrofuran (THF) at room temperature for one day long.

TABLE 2

| | Aliphatic series of unsaturated group-containing compound () indicates part by weight | Photo-reaction initiator () indicates parts by weight | Ultraviolet ray irradiation conditions Temperature (°C.) | Time (min) | Film properties Elastic recovery (%) | Heat deformation temperature (°C.) | Reduced specific viscosity |
|---|---|---|---|---|---|---|---|
| Example 10 | diallylglycidylisocyanurate (2) | benzilmethylketal (1) | 50 | 1 | 93 | >300 | *(87) |
| Example 11 | allyldiglycidylisocyanurate (4) | benzoinethylether (1) | 40 | 0.5 | 90 | >300 | *(89) |
| Example 12 | dimethyallylglycidylcyanurate (2) | benzophenone (1) | 100 | 1 | 94 | >300 | *(91) |
| Example 13 | dicrotylglycidylcyanurate (4) | benzilbis(2-methoxyethyl)ketal (1) | 80 | 0.5 | 91 | >300 | *(86) |
| Comparative Example 2 | — | — | — | — | 75 | 146 | 2.5 |

*indicates insoluble even if immersed in a viscosity measurement solvent at 100° C. for one hour. () indicates amount (%) of insoluble matter.

Furthermore, the film of Comparative Example 2 was extremely great in the tackiness between the film and inconvenient to handle, but those of Examples 10–13 were totally free of tackiness in either instance.

TABLE 3

| | Aliphatic series of unsaturated group-containing compound ( ) indicates part | Photo-reaction initiator ( ) indicates part | Ultraviolet ray irradiation conditions Temperature (°C.) | Time (min) | Film properties Elastic recovery (%) | Heat deformation temperature (°C.) | Chemical resistance Acetone | THF |
|---|---|---|---|---|---|---|---|---|
| Example 14 | N,N,N',N'-tetraallylterephthalamide (3) | benzildimethylketal (1) | 100 | 0.5 | 91 | >300 | 12 | 97 |
| Example 15 | N,N'-diallyladipamide (3) | benzilbis(2-methoxyethyl) | 100 | 2 | 89 | >300 | 12 | 99 |

TABLE 3-continued

| | Aliphatic series of unsaturated group-containing compound ( ) indicates part | Photo-reaction initiator ( ) indicates part | Ultraviolet ray irradiation conditions | | Film properties | | | |
|---|---|---|---|---|---|---|---|---|
| | | | | | Elastic recovery (%) | Heat deformation temperature (°C.) | Chemical resistance | |
| | | | Temperature (°C.) | Time (min) | | | Acetone | THF |
| Example 16 | N,N,N',N',N'',N''-octaallylpyromellitamide (1) | benziltrimethylene-ketal (1) / ethylenebis(benzoylbenzamide) (1) | 100 | 1 | 90 | >300 | 14 | 110 |
| Example 17 | N,N,N',N',N'',N''-hexaallytrimellitamide (3) | hexamethylenebis(benzoylbenzamide) (1) | 95 | 1 | 90 | >300 | 12 | 106 |
| Example 18 | ethylenebis(diallylisocyanurate) (3) | benzildimethylketal (1) | 90 | 1 | 95 | >300 | 13 | 95 |
| Example 19 | 1,2-bis(3,5-diallylisocyanuroethyloxy)ethane (3) | decamethylenebis(benzoylbenzamide) (1) | 100 | 1.5 | 93 | >300 | 13 | 97 |
| Example 20 | tetramethylenebis(diallylisocyanurate) (2) | benzilneopentyleneketal (1) | 100 | 1 | 94 | >300 | 14 | 98 |
| Example 21 | N,N,N',N'-tetraallyl-2,3-epoxybutane-1,4-dicarboxamide (3) | benzilethyleneketal (0.5) | 100 | 1 | 90 | >300 | 13 | 93 |
| Example 22 | N,N,N',N'-tetraallyl-4,5-epoxycyclohexane-1,2-dicarboxamide (3) | ethylenebis(benzoylbenzamide) (1) | 25* | 1 | 96 | >300 | 12 | 90 |
| Example 23 | N,N-diallyl-p-glycidyloxybenzamide (5) | benzoin (1) | 70 | 2 | 97 | >300 | 9 | 89 |
| Comparative Example 3 | — | — | — | — | 77 | 147 | 40 | >500 |

*irradiated in water

EXAMPLE 24

5 parts of N,N-diallyl(p-benzoylbenzamide) was mixed to 100 parts of polyester elastomer used in Examples 1–9 to obtain film about 400μ thick in the same way as in Examples 1–9. It was then irradiated with ultraviolet ray at similar conditions to those of Example 1. The film obtained was insoluble in orthochlorophenol and did not melt even at 300° C. Elastic recovery was 91%.

EXAMPLES 25–30 AND COMPARATIVE EXAMPLE 4

Transparent elastomer with reduced specific viscosity of 2.10 was obtained by causing the reaction between 194 parts of dimethylterephthalate, 118 parts of ethylene glycol, 23.6 parts of hexamethylene glycol, 190 parts of polytetramethylene glycol with molecular weight of 1000 and 0.17 part of titanium tetrabutoxide. Then predetermined amounts of the aliphatic series of unsaturated group-containing compounds and predetermined amounts of photo-reaction initiators as shown in the following Table 4 were mixed with regard to 100 parts of the polymer in the same way as in Examples 1–9 and then the said mixture was melt-extruded at 260° C. from an annular nozzle about 1 mm in diameter to give filaments about 500μ in diameter.

After that, the said filaments were irradiated with ultraviolet ray during a given period of time from a position about 20 cm away by a 100 W high pressure mercury lamp under such conditions as shown in the following Table 4. Indications were made of elastic recovery, melting points, orthochlorophenol solubility of the filaments obtained. As control experiment with one which was irradiated with ultraviolet ray without adding the aliphatic series of unsaturated group-containing compound and photo-reaction initiator was conducted in the same way, and results were shown in Table 4.

TABLE 4

| | Aliphatic series of unsaturated group-containing compound ( ) indicates part | Photo-reaction initiator ( ) indicates part | Ultraviolet ray irradiation conditions | | Physical properties of filaments | | |
|---|---|---|---|---|---|---|---|
| | | | Temperature (°C.) | Time (min) | Elastic recovery (%) | Melting point (°C.) | Insoluble residue in orthochlorophenol (%) |
| Example 25 | N,N,N',N'-tetraallyl-4-cyclohexene-1,2-dicarboxamide (3) | benziltrimethyleneketal (1) | 100 | 1 | 79 | >300 | 88 |
| Example 26 | N,N'-diallylcyclopentane-1,2,3,4-tetracarboxylic acid bisimide (5) | tetramethylenebis(benzoylbenzamide) (1) | 90 | 1 | 80 | >300 | 90 |
| Example 27 | hexamethylenebis(diallylisocyanurate) (5) | benzoinpropylether (0.5) | 80 | 2 | 78 | >300 | 86 |
| | ethylenebis(dimeth- | dodecamethyl- | | | | | |

TABLE 4-continued

| | Aliphatic series of unsaturated group-containing compound ( ) indicates part | Photo-reaction initiator ( ) indicates part | Ultraviolet ray irradiation conditions | | Physical properties of filaments | | |
|---|---|---|---|---|---|---|---|
| | | | Temperature (°C.) | Time (min) | Elastic recovery (%) | Melting point (°C.) | Insoluble residue in orthochlorophenol (%) |
| Example 28 | allylisocyanurate) (4) | enebis(benzoylbenzamide) (1) | 100 | 1 | 80 | >300 | 89 |
| Example 29 | tetramethylenebis(diallylcyanurate) (2) | hexamethylenebis(4-acetylbenzamide) (1) | 90 | 1 | 77 | >300 | 87 |
| Example 30 | hexamethylenebis(dicrotylcyanurate) (3) | benzildiisopropylketal (1) | 80 | 2 | 81 | >300 | 92 |
| Comparative Example 4 | — | — | 90 | 1 | 67 | 153 | 0 |

EXAMPLES 31–35 AND COMPARATIVE EXAMPLE 5

Transparent elastomer with reduced specific viscosity of 2.18 was obtained by causing the reaction in the presence of catalyst between 194 parts of dimethylterephthalate, 124 parts of ethylene glycol, 35.4 parts of hexamethylene glycol and 190 parts of polytetramethyle glycol with molecular weight of 1000. The aliphatic series of unsaturated group-containing compounds and photo-reaction initiators as shown in the following Table 5 were mixed in their respective predetermined amounts based on 100 parts of the said polymer in the same way as in Examples 25–30, and then the said mixture was melt extruded at 260° C. from the annular nozzle about 1 mm in diameter to give filaments about 500μ in diameter.

After that, the said filaments were irradiated with ultraviolet ray during a given period of time from a position about 20 cm away by means of a 100 W high pressure mercury lamp at such conditions as shown in the following Table 5. The following Table 5 shows melting points and orthochlorophenol-solubility of the filaments obtained.

As control the similar test was conducted on the one which was irradiated with ultraviolet ray without adding the aliphatic series of unsaturated group-containing compound and photo-reaction initiator, and results were shown in the following Table 5.

TABLE 5

| | Aliphatic series of unsaturated group-containing compound ( ) indicates part | Photo-reaction initiator ( ) indicates part | Ultraviolet ray irradiation conditions | | Physical properties of filaments | |
|---|---|---|---|---|---|---|
| | | | Temperature (°C.) | Time (min) | Heat deformation temperature (°C.) | Insoluble residue in orthochlorophenol (%) |
| Example 31 | dimethallyl-(2,3-epoxybutyl)isocyanurate (4) | tetramethylenebis-(benzoylbenzamide) (2) | 80 | 1 | >300 | 92 |
| Example 32 | 2,2-bis(3-allyl-4-glycidyloxyphenyl)-propane (5) | benzildiethylketal (1) | 90 | 2 | >300 | 93 |
| Example 33 | N,N,N',N'-tetraallyl-4,5-epoxycyclohexane-1,2-dicarboxamide (5) | benzilneopentylketal (1) | 90 | 2 | >300 | 95 |
| Example 34 | 2,2-bis(3,5-diallyl-4-glycidyloxyphenyl)-propane (4) | benzildimethylketal (1) | 90 | 2 | >300 | 94 |
| Example 35 | N,N,N',N'-tetramethallyl-4,5-epoxycyclohexane-1,2-dicarboxamide (5) | benzoinethylether (1) | 90 | 2 | >300 | 92 |
| Comparative Example 5 | — | — | 90 | 2 | 153 | 0 |

EXAMPLE 36 AND COMPARATIVE EXAMPLE 6

100 parts of linear polyester elastomer (reduced specific viscosity 1.97) obtained by causing the reaction in the presence of catalyst between 186.2 parts of dimethylterephthalate, 6.8 parts of 4-cyclohexene-1,2-dicarboxylic acid, 176 parts of polyethylene glycol with molecular weight of about 2000 and 124 parts of ethylene glycol, and 1 part of benzophenone were placed in a reactor with a stirrer, and after replacement of nitrogen, stirred and mixed at 270° C. for 5 minutes. Then the composition obtained was pressed on the hot plate held at 270° C. and quenched to give a sheet about 1 mm thick. The said sheet was placed on the hot plate held at 150° C. and irradiated for 2 minutes long from a position about 20 cm away by means of a 1 KW high pressure mercury lamp (10 W/cm). The sheet so obtained was totally insoluble in orthochlorophenol, the heat deformation temperature, as measured, was 300° C. or more and elastic recovery was 87%.

As control a sheet was prepared by using polyester elastomer obtained by polymerizing in the same way as the above without adding 4-cyclohexene-1,2-dicarboxylic acid, and its physical properties were measured, in consequence of which the heat deformation temperature was 205° C. and elastic recovery was 74%, which was inferior to those of the instant invention.

EXAMPLE 37 AND COMPARAATIVE EXAMPLE 7

100 parts of polyester elastomer (reduced specific viscosity 1.82) obtained by causing the reaction between 194 parts of dimethylterephthalate, 90 parts of polytetramethylene glycol with molecular weight of about 1000, 135 parts of tetramethylene glycol, 14.2 parts of 3-cyclohexene-1,1-dimethanol and 0.102 part of titanium tetrabutoxide, was thoroughly mixed by means of S-type blender with 1 part of hexamethylenebis(benzoylbenzamide), then fused at 250° C. and extruded from the T-die to give film about 300μ thick. The film obtained was white and intransparent. The said film was irradiated in the same way as in Example 36 except that the irradiation time was set as 3 minutes by using the same high pressure mercury lamp as used in Example 36. The film so obtained was totally insoluble in orthochlorophenol, the heat deformation temperature was 300° C. or more and elastic recovery was 61%.

As control was used polyester obtained in the same way as the above except that no 3-cyclohexene-1,1-dimethanol was used. The said polyester was fused and extruded in the same way as the above. The film obtained readily dissolved in orthochlorophenol, the heat deformation temperature was 206° C. and elastic recovery was 52%.

EXAMPLES 38, 39

The films designed to irradiate with ultraviolet ray in Examples 14 and 21 were irradiated with electron beams at a dose of 5 Mrad at 50° C., in consequence of which the films obtained were insoluble in orthochlorophenol in either instance. The weight increased rate in the case of immersing in acetone at room temperature for one day was as low as 15% in either instance and elastic recovery was 89% and 87% respectively.

EXAMPLE 40 AND COMPARATIVE EXAMPLE 8

100 parts of linear polyester elastomer (reduced specific viscosity 1.89) obtained by causing the reaction in the presence of catalyst between 194 parts of dimethylterephthalate, 176 parts of polyethylene glycol with molecular weight of about 2000 and 124 parts of ethylene glycol, 7 parts of diallylglycidylisocyanurate and 1 part of benzophenone were placed in a reactor with a stirrer, and after replacement of nitrogen, stirred and mixed at 270° C. for 5 minutes long. Then the composition obtained was pressed on the hot plate held at 270° C. and quenched to give a sheet about 1 mm thick. Then the said sheet was placed on the hot plate held at 130° C. and irradiated for 2 minutes long from a position about 20 cm away by means of a 1 KW high pressure mercury lamp (10 W/cm). The sheet obtained was totally insoluble in orthochlorophenol. The heat deformation temperature, as measured, was 300° C. or more and elastic recovery was 89%.

As control the linear polyester elastomer alone was molded into a sheet in the same way as the above and its phydical properties were measured, in consequence of which the heat deformation temperature was 207° C. and elastic recovery was 73%.

EXAMPLE 41 AND COMPARATIVE EXAMPLE 9

100 parts of polyester elastomer (reduced specific viscosity 2.15) obtained by causing the reaction between 194 parts of dimethyltetrephthalate, 90 parts of polytetramethylene glycol with molecular weight of about 1000, 135 parts of tetramethylene glycol and 0.14 part of titanium tetrabutoxide, and 5 parts of diallyl-(2,3-epoxy-2-methylpropyl)isocyanurate, and 1 part of hexamethylenebis(benzoylbenzamide) were thoroughly mixed together by means of S-type blender, then fused at 250° C. and extruded from the T-die to give film about 400μ thick. The film obtained was white and opaque. Then the said film was irradiated in the same way as in Example 40 except that the irradiation time was set as 3 minutes by means of the same high pressure mercury lamp as used in Example 40. The film so obtained was totally insoluble in orthochlorophenol, the heat deformation temperature was 300° C. or more and elastic recovery was 64%.

As control the said film not irradiated with ultraviolet ray showed the heat deformation temperature of 209° C. and elastic recovery of 48%. It dissolved readily in orthochlorophenol.

EXAMPLES 42-44 AND COMPARATIVE EXAMPLE 10

Polyester elastomer with reduced specific viscosity of 2.43 was obtained by causing the reaction between 194 parts of dimethylterephthalate, 190 parts of tetramethylene glycol, 330 parts of polytetramethylene glycol with molecular weight of about 1500 and 0.17 part of titanium tetrabutoxide. The predetermined amounts of the aliphatic series of unsaturated group-containing compounds as shown in the following Table 6 were mixed to 100 parts of the said polyester, and then molded into a disk about 3 mm thick and 12 cm across by melt injection molding at 240° C. The said disk was irradiated with gamma ray at a dose of 10 Mrad at room temperature and its physical properties were measured. Results were shown in the following Table 6. As Comparative Example 10 indications were also made of physical properties of shaped article which was injection-molded without addition of the aliphatic series of unsaturated group-containing compound.

TABLE 6

| | Aliphatic series of unsaturated group-containing compound ( ) indicates part | Insoluble residue in orthochlorophenol (%) | Wear amount* (mg) |
|---|---|---|---|
| Ex. 42 | ethylene bis(diallylisocyanurate) (2) | 91 | 3 |
| Ex. 43 | oxydiethylene bis(diallylisocyanurate) (4) | 93 | 1 |
| Ex. 44 | tetramethylene bis(dicrotylisocyanurate) (2) | 89 | 3 |
| Comparative | — | 0 | 25 |

TABLE 6-continued

| Aliphatic series of unsaturated group-containing compound ( ) indicates part | Insoluble residue in orthochlorophenol (%) | Wear amount* (mg) |
|---|---|---|
| Ex. 10 | | |

*Wear amount in the case of 1000 turns with a load of 1 Kg by means of CS-17 wheel (ASTM D-1044)

What we claim is:

1. A process for preparing a cured copolyetherester elastomeric composition comprising following steps I and II:

Step I: melt-extruding an uncured linear copolyetherester elastomeric composition of [A] and [B] to follow:

[A] a linear saturated copolyetherester elastomer composed of
(A-1) a hard segment consisting of
  (i) an acid component of which at least 70 mol % is an aromatic dicarboxylic acid and
  (ii) a diol component having an average molecular weight of up to 350, and
(A-2) a soft segment consisting of
  (iii) a polyalkylene glycol having an average molecular weight of from 500 to 5,000 in an amount of from 10 to 80% by weight based on the elastomer [A]; and

[B] a compound having an unsaturated aliphatic moiety other than unsaturated conjugated moieties, said compound [B] being copolymerized or blended with said elastomer [A], wherein said unsaturated aliphatic moiety is chemically inert at the melt-extruding temperature, the amount of said moiety being 0.001 to 0.5 equivalent per 100 grams of said elastomer [A], said compound [B] being represented by the following formula $$\{(AQ_4)_{f_1}X_1\}_{f_2}Q_6\{Y_1(Q_5B)_{f_3}\}_{f_4} \quad (10)$$

wherein A represents a group of the formula

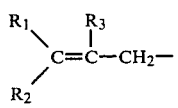

$$(2)$$

wherein $R_1$, $R_2$ and $R_3$ are identical or different, and each represent a group selected from the class consisting of a hydrogen atom and alkyl group with 1 to 6 carbon atoms; B represents an epoxy group of the formula

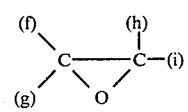

$$(9)$$

in which bonds (f) to (i) are bonded to hydrogen atoms or alkyl groups with 1 to 6 carbon atoms, and bond (i) or bonds (i) and (g) are organic moieties including general formula (2), $X_1$ represents a direct bond, —O—,

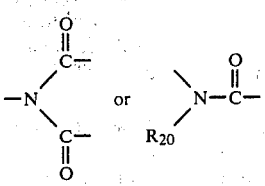

in which $R_{20}$ represents a hydrogen atom, an alkyl group containing 1 to 6 carbon atoms, or $AQ_4$—; $Y_1$ represents a direct bond, —O—, or —NH—; $Q_6$ represents an organic group having a valence of 2 to 4; $Q_4$ and $Q_5$ represent a direct bond or an organic group having a valence of 2 to 4; and $f_1$, $f_2$, $f_3$ and $f_4$ are positive integers.

Step II: curing the resulting extrudate by irradiation of actinic light.

2. The process of claim 1 wherein the compound [B] is a cyanuric or isocyanuric acid derivative corresponding to general formula (10) in which $X_1$ and $Y_1$ represent a direct bond; $Q_6$ represents

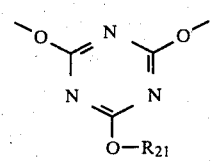

or

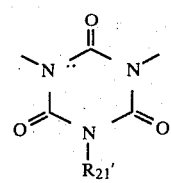

in which $R_{21}$ and $R_{21}'$ represent an alkyl group, $AQ_4$—, or $BQ_5$—, $Q_4$ and $Q_5$ represent a direct bond or an alkylene group with 1 to 5 carbon atoms, and each of $f_1$, $f_2$, $f_3$ and $f_4$ is 1.

3. The process of claim 1 wherein the compound [B] is an imide or amide compound corresponding to general formula (10) wherein $X_1$ is >NCO—, or

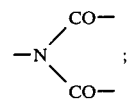

;

$Q_6$ represents an aliphatic group having a valence of 2 to 4 and containing 2 to 20 carbon atoms, an alicyclic group having a valence of 2 to 4 and containing 4 to 12 carbon atoms, a group having a valence of 2 to 4 and comprising

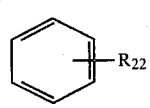

(in which $R_{22}$ represents a hydrogen atom, an aryl group with 6 to 12 carbon atoms, an alkyl group with 1 to 6 carbon atoms, an alkyloxy group with 1 to 6 carbon atoms, a nitro group or a halogen atom), a group having a valence of 2 to 4 and comprising

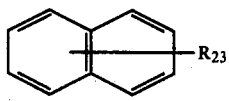

(in which $R_{23}$ is as defined above), or a group having a valence of 2 to 4 and comprising

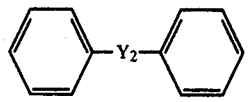

(in which $Y_2$ represents a member of the group consisting of —O—, —CO—, —SO$_2$—, —NR$_{22}'$—, R$_{22'}$, being a hydrogen atom or an alkyl group with 1 to 6 carbon atoms, —O(CH$_2$CH$_2$)$_l$O—, $l$ being an integer of 1 to 3, and alkylene groups with 2 to 12 carbon atoms); and Q$_4$ and Q$_5$ represent a direct bond or an alkylene group having 1 to 5 carbon atoms.

4. The process of claim 1, wherein said compound [B] is copolymerized with said elastomer [A].

5. The process of claim 1, wherein said compound [B] is blended with said elastomer [A].

6. The process of claim 1, wherein the copolyetherester elastomer [A] is composed of
 (A-1) a hard segment consisting of
  (i) an acid component of which at least 80 mol % is an aromatic dicarboxylic acid, and (ii) a diol component having an average molecular weight of up to 350, and
 (A-2) a soft segment consisting of
  (iii) a polyaklylene glycol having an average molecular weight of from 600 to 4,000 in an amount of from 15 to 75% by weight, based on the elastomer [A].

7. The process of claim 6 wherein the acid component (i) is selected from the group consisting of terephthalic acid, isophthalic acid, naphthalenedicarboxylic acid, diphenyldicarboxylic acid, diphenylsulfonedicarboxylic acid, diphenoxyethanedicarboxylic acid, diphenyletherdicarboxylic acid, methylterephthalic acid, and methylisophthalic acid; said diol component (ii) is selected from the group consisting of ethylene glycol, trimethylene glycol, tetramethylene glycol, neopentylene glycol, hexamethylene glycol, decamethylene glycol, cyclohexane dimethyol, 2,2-bis($\beta$-hydroxyethoxyphenyl)propane, hydroquinone, and 2,2-bis (hydroxyphenyl)propane; and the polyalkylene glycol (iii) is selected from the group consisting of polyethylene glycol, polypropylene glycol, polytrimethylene glycol and polytetramethylene glycol or copolymers of any of these glycols.

8. The process of claim 7 wherein the acid component (i) is terephthalic acid, the diol component (ii) is tetramethylene glycol and the polyalkylene glycol (iii) is polytetramethylene glycol.

9. The process of claim 1 wherein the amount of said unsaturated aliphatic moiety in said compound [B] is from 0.01 to 0.1 equivalent, per 100 grams of the elastomer [A].

10. The process of claim 2 wherein compound [B] is a member selected from the group consisting of
 diallyl, dimethallyl, and dicrotyl glycidyl cyanurate,
 diallyl, dimethallyl and dicrotyl glycidyl isocyanurate,
 allyl, ethallyl and crotyl diglycidyl cyanurate,
 allyl, methallyl and crotyl diglycidyl isocyanurate,
 diallyl-(2,3-epoxy-2-methylpropyl)cyanurate,
 dimethallyl-(2,3-epoxy-2-methylpropyl)isocyanurate,
 dimethallyl-(2,3-epoxy-2-methylpropyl)isocyanurate,
  dicrotyl-(2,3-epoxy-2-methylpropyl)isocyanurate,
 diallyl-(2,3-epoxybutyl)cyanurate,
 diallyl-(2,3-epoxybutyl)isocyanurate,
 dimethallyl-(2,3-epoxybutyl)cyanurate,
 dimethallyl-(2,3-epoxybutyl)isocyanurate
 dicrotyl-(2,3-epoxybutyl)isocyanurate,
 dially-(2,3-epoxy-2-methylbutyl)cyanurate, and diallyl-(2,3-epoxy-2-methylbutyl)isocyanurate.

* * * * *